US011196617B2

(12) United States Patent
Park et al.

(10) Patent No.: US 11,196,617 B2
(45) Date of Patent: Dec. 7, 2021

(54) ELECTRONIC DEVICE FOR DETERMINING RADIO LINK FAILURE IN WIRELESS NETWORK AND METHOD THEREOF

(71) Applicant: Samsung Electronics Co., Ltd., Gyeonggi-do (KR)

(72) Inventors: Sungjin Park, Gyeonggi-do (KR); Hyoungjoo Lee, Gyeonggi-do (KR); Taeyoon Kim, Gyeonggi-do (KR); Chaiman Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 16/688,195

(22) Filed: Nov. 19, 2019

(65) Prior Publication Data

US 2020/0169456 A1 May 28, 2020

(30) Foreign Application Priority Data

Nov. 23, 2018 (KR) .................. 10-2018-0146211

(51) Int. Cl.
*H04L 12/24* (2006.01)
*H04W 28/04* (2009.01)
(Continued)

(52) U.S. Cl.
CPC ......... *H04L 41/0668* (2013.01); *H04W 24/10* (2013.01); *H04W 28/04* (2013.01); *H04W 76/18* (2018.02)

(58) Field of Classification Search
None
See application file for complete search history.

(56) References Cited

U.S. PATENT DOCUMENTS

2017/0048898 A1 2/2017 Jung et al.
2018/0206170 A1 7/2018 Nagaraja et al.
(Continued)

FOREIGN PATENT DOCUMENTS

WO 2018/083624 A1 5/2018
WO 2018/0204255 A1 11/2018
WO 2018/0204863 A1 11/2018

OTHER PUBLICATIONS

Huawei et al.; "Beam failure recovery for Scell"; R1-1813561; 3GPP TSG RAN WG1 Meeting #95; Spokane, USA; Nov. 3, 2018.

(Continued)

*Primary Examiner* — Edan Orgad
*Assistant Examiner* — Emmanuel K Maglo
(74) *Attorney, Agent, or Firm* — Cha & Reiter, LLC

(57) ABSTRACT

An electronic device may establish a beam pair link, using a first Tx beam included in a plurality of Tx beams having different directions transmitted from a base station, and a first Rx beam included in a plurality of Rx beams, may receive information associated with the plurality of Tx beams, using the beam pair link, may receive a plurality of first signal blocks, using the beam pair link, may perform first decoding of the first signal blocks, may determine beam failure for the first Tx beam based at least partly on the result of the first decoding, may identify measurement information about the plurality of Tx beams, and may determine RLF associated with the base station based on the measurement information and information associated with the Tx beams.

16 Claims, 13 Drawing Sheets

(51) Int. Cl.
    *H04W 76/18*    (2018.01)
    *H04W 24/10*    (2009.01)

(56) References Cited

U.S. PATENT DOCUMENTS

| | | |
|---|---|---|
| 2018/0227899 A1 | 8/2018 | Yu et al. |
| 2019/0052343 A1* | 2/2019 | Li ........................ H04W 72/046 |
| 2019/0053288 A1* | 2/2019 | Zhou ................... H04W 74/006 |
| 2019/0058629 A1* | 2/2019 | Akoum ............... H04W 56/001 |
| 2019/0081675 A1* | 3/2019 | Jung ................... H04W 56/001 |
| 2019/0089579 A1* | 3/2019 | Sang ..................... H04W 76/27 |
| 2019/0090143 A1* | 3/2019 | Luo ....................... H04B 7/0617 |
| 2019/0098655 A1* | 3/2019 | Shih ................... H04W 72/0413 |
| 2019/0132066 A1 | 5/2019 | Park et al. |
| 2019/0132777 A1 | 5/2019 | Park et al. |
| 2019/0132778 A1 | 5/2019 | Park et al. |
| 2019/0141592 A1 | 5/2019 | Park et al. |
| 2019/0215048 A1* | 7/2019 | Cirik ...................... H04B 7/088 |
| 2019/0245737 A1* | 8/2019 | Zhou .................. H04L 41/0668 |
| 2019/0261344 A1 | 8/2019 | Grant et al. |
| 2020/0092785 A1* | 3/2020 | Yang ..................... H04W 76/19 |
| 2021/0204346 A1* | 7/2021 | Ye ............................ H04B 7/00 |

OTHER PUBLICATIONS

"Discussion on beam failure recovery"; R1-1717473; 3GPP TSG RAN WG1 Meeting #90bis; Prague, CZ; Oct. 2017.
International Search Report dated Mar. 14, 2020.
European Search Report dated Mar. 18, 2020.

\* cited by examiner

US 11,196,617 B2

1

ELECTRONIC DEVICE FOR DETERMINING RADIO LINK FAILURE IN WIRELESS NETWORK AND METHOD THEREOF

CROSS-REFERENCE TO RELATED APPLICATION(S)

This application is based on and claims priority under 35 U.S.C. § 119 to Korean Patent Application No. 10-2018-0146211, filed on Nov. 23, 2018, in the Korean Intellectual Property Office, the disclosure of which is incorporated by reference herein its entirety.

BACKGROUND

1. Field

The instant disclosure generally relates to an electronic device for determining radio link failure (RLF) in a wireless network and a method thereof.

2. Description of Related Art

The standard specification for 4th generation (4G) or 5th generation (5G) communication promulgated by the 3rd Generation Partnership Project (3GPP) defines RLF. 4G communication may be referred to as long term evolution (LTE), and 5G communication may be referred to as new radio (NR). When the electric field of a cell provided from a base station is not good, an electronic device may determine or declare RLF.

The above information is presented as background information only to assist with an understanding of the disclosure. No determination has been made, and no assertion is made, as to whether any of the above might be applicable as prior art with regard to the disclosure.

SUMMARY

One of the methods to determine RLF according to the LTE or NR standard specifications of 3GPP is as follows.

An electronic device may periodically receive a signal block (e.g., physical downlink control channel (PDCCH)), in which a reference signal is included, from a base station. When the quality (e.g., reference signal received power (RSRP)) of the reference signal is less than a threshold or when the decoding of the received signal block fails, the electronic device may determine that the physical channel is out-of-sync. When the out-of-sync occurs a specified number of times (e.g., N310), the electronic device may start a first timer (e.g., T310). After the first timer is started, the electronic device may receive additional signal blocks and then may attempt to decode the received signal blocks. When the success of decoding (hereinafter referred to as in-sync) occurs a specified number of times (e.g., N311) before the timer expires, the electronic device may interrupt the timer. When in-sync does not occur the specified number of times before the timer expires, the electronic device may determine RLF.

When RLF is determined, the electronic device may perform a radio resource control (RRC) re-establishment procedure at the current cell or another cell. When the RRC re-establishment procedure fails, the electronic device may perform a cell search procedure to search for another cell. In another example, when RLF is determined, the electronic device may perform an attach procedure for connecting to a cell of another base station. Using the RRC re-establishment procedure, the cell search operation, or the attach procedure, the electronic device may maintain wireless communication with a base station and may provide the user with service continuity.

In accordance with the standard specifications of 3GPP, because communication may be delayed until RLF is determined after the expiration of the first timer, the electronic device may not receive services from the base station or may receive poor quality service during the delay. Due to Quality of Service (QoS) requirements, if the service from the base station is poor, calls to/from the electronic device may be dropped.

Aspects of the disclosure are to address at least the above-mentioned problems and/or disadvantages and to provide at least the advantages described below. Accordingly, an aspect of the disclosure is to provide an electronic device for determining RLF using beam failure and a method thereof.

In accordance with an aspect of the disclosure, an electronic device may include housing, at least one antenna array disposed inside the housing or constituting as a part of the housing and including a plurality of antenna elements, a processor forming a plurality of reception beams (Rx beams) having different directions, using the antenna array, and a memory operatively connected to the processor and storing a threshold. The memory may store instructions that, when executed, cause the processor to establish a beam pair link, using a first Tx beam included in a plurality of transmission beams (Tx beams) having different directions transmitted from a base station, and a first Rx beam included in the plurality of Rx beams, to receive information associated with an 'M' number of candidate Tx beams from among the plurality of Tx beams using the beam pair link, where the first Tx beam is excluded from the 'M' number of candidate Tx beams, to select an 'I' number of candidate Tx beams from among the 'M' number of candidate Tx beams based on the information associated with the 'M' number of candidate Tx beams and the threshold, to receive a plurality of first signal blocks, using the beam pair link, to perform first decoding of the first signal blocks, to determine beam failure for the first Tx beam based at least partly on the result of the first decoding, to start a first timer associated with radio link failure (RLF) based at least partly on the result of the first decoding, to perform beam failure recovery associated with the 'I' number of candidate Tx beams based on determining that the beam failure has occurred, using the first Rx beam, and to determine the RLF associated with the base station before the first timer expires, based at least partly on the result of performing the beam failure recovery. The 'M' may be an integer of one or more, and the 'I' may be an integer of zero or more.

In accordance with another aspect of the disclosure, an electronic device may include housing, at least one antenna array disposed inside the housing or constituting as a part of the housing and including a plurality of antenna elements, a processor forming a plurality of Rx beams having different directions, using the antenna array, and a memory operatively connected with the processor. The memory may store instructions that, when executed, cause the processor to establish a beam pair link, using a first Tx beam included in a plurality of Tx beams having different directions transmitted from a base station, and a first Rx beam included in the plurality of Rx beams, to receive information associated with the plurality of Tx beams, using the beam pair link, to receive a plurality of first signal blocks, using the beam pair link, to perform first decoding of the first signal blocks, to determine beam failure for the first Tx beam based at least partly on the result of the first decoding, to identify measurement information about the plurality of Tx beams; and to determine RLF associated with the base station based on the measurement information and the information associated with the Tx beams. The information associated with the plurality of Tx beams may include at least one of a list of candidate Tx beams among the plurality of Tx beams or a threshold associated with qualities of the plurality of Tx beams.

In accordance with another aspect of the disclosure, a method of an electronic device may include establishing a beam pair link, using a first Tx beam included in a plurality of Tx beams having different directions transmitted from a base station, and a first Rx beam included in the plurality of Rx beams, receiving information associated with the plurality of Tx beams, using the beam pair link, receiving a plurality of first signal blocks, using the beam pair link, performing first decoding of the first signal blocks, determining beam failure for the first Tx beam based at least partly on the result of the first decoding, identifying measurement information about the plurality of Tx beams, and determining RLF associated with the base station based on the measurement information and the information associated with the Tx beams. The information associated with the plurality of Tx beams may include at least one of a list of candidate Tx beams among the plurality of Tx beams or a threshold associated with qualities of the plurality of Tx beams.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Figure 1:
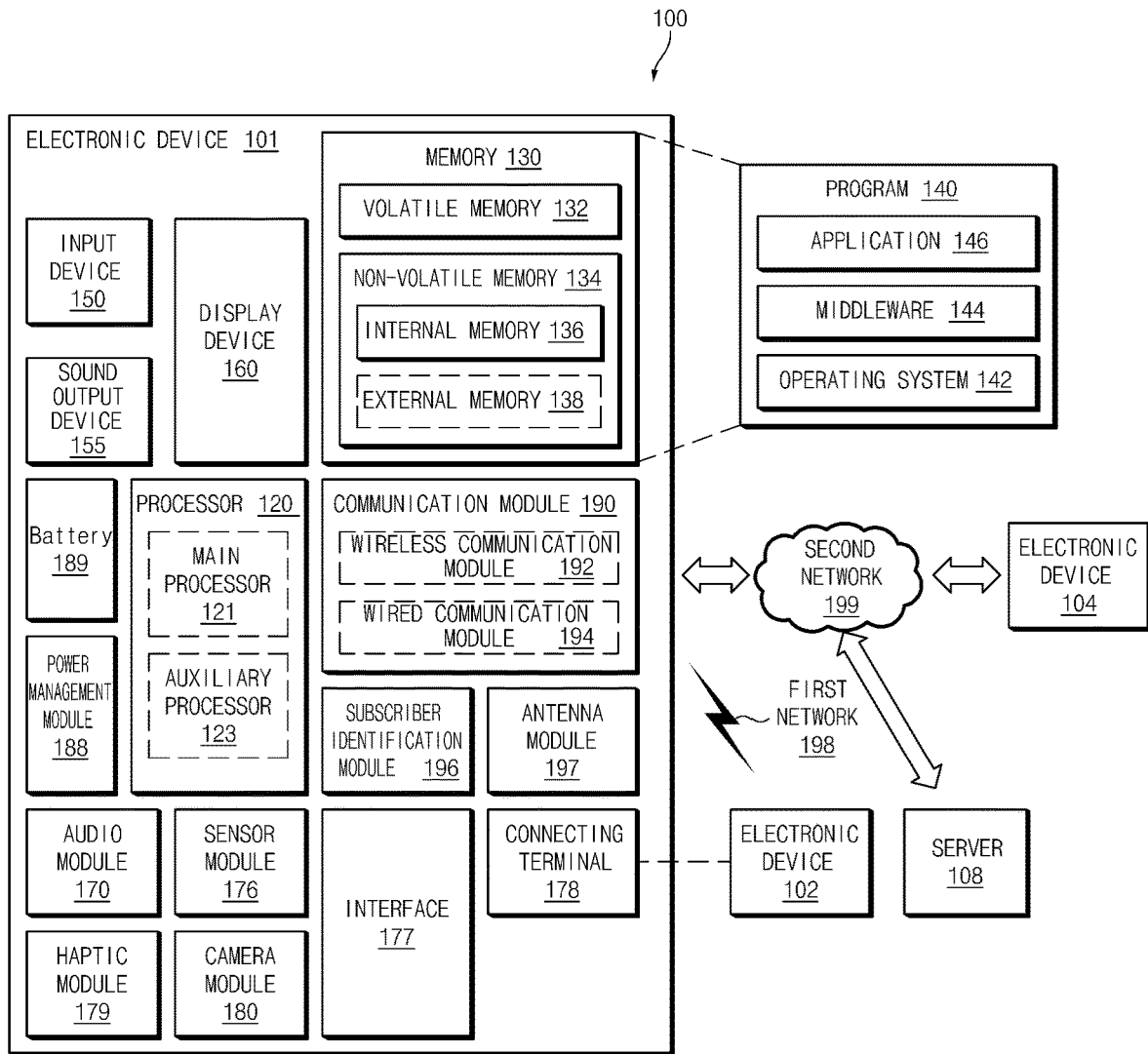
FIG. 1 is a block diagram of an electronic device in a network environment, according to an embodiment.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
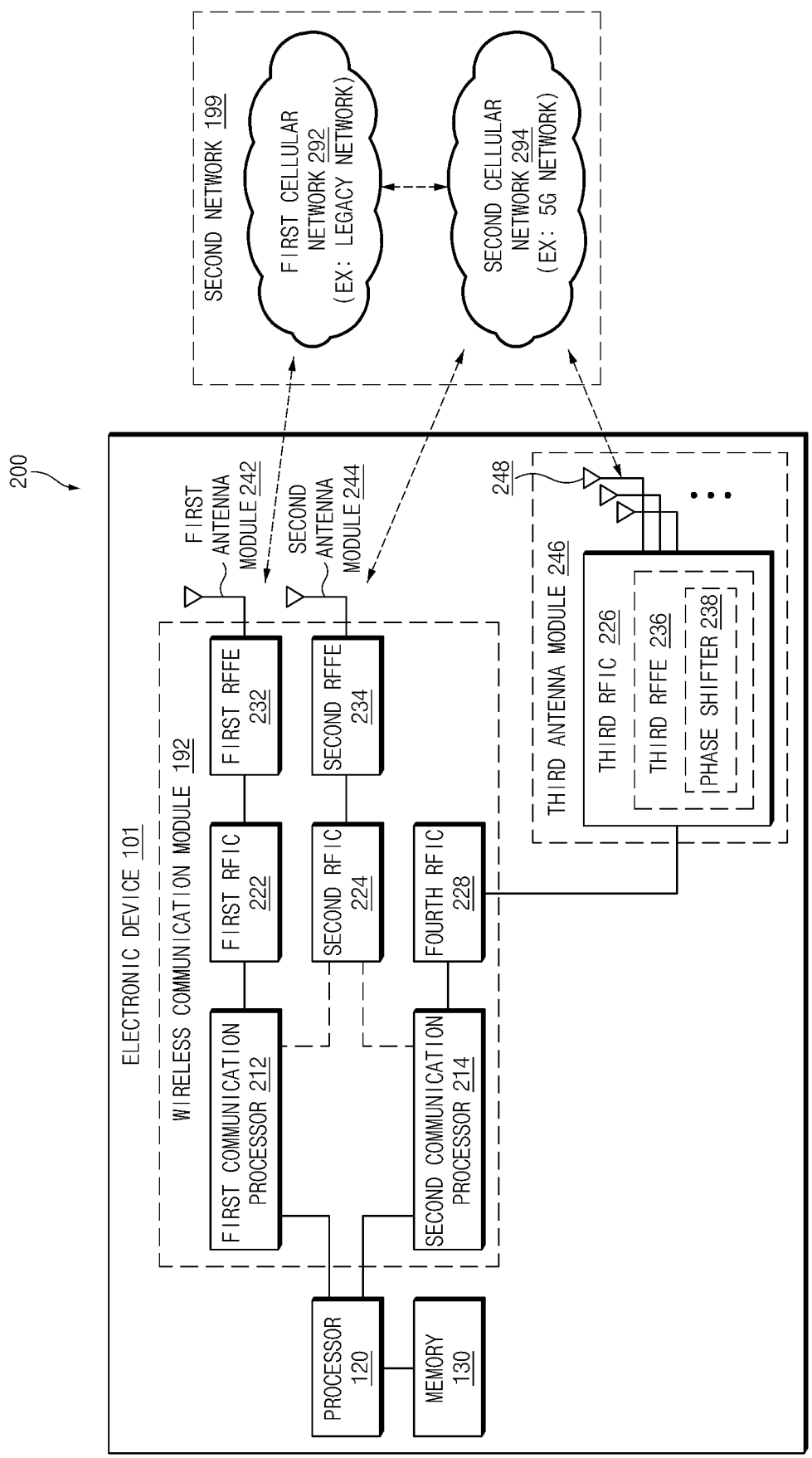
FIG. 2 is a block diagram of an electronic device for supporting legacy network communication and 5G network communication, according to an embodiment.

FIG. 2 is a block diagram 200 of the electronic device 101 for supporting legacy network communication and 5G network communication, according to an embodiment.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first network 292 and a second network 294. According to another embodiment, the electronic device 101 may further include at least one of the components described in FIG. 1, and the second network 199 may include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or included as the part of the third RFIC 226.

The first communication processor 212 may establish a communication channel for a band to be used for wireless communication with the first network 292 and may support legacy network communication through the established communication channel. According to an embodiment, the first network 292 may be a legacy network including a 2nd generation (2G), 3G, 4G, or long term evolution (LTE) network. The second communication processor 214 may support the establishment of a communication channel corresponding to a specified band (e.g., about 6 GHz~ about 60 GHz) among bands to be used for wireless communication with the second network 294 and 5G network communication via the established communication channel. According to an embodiment, the second network 294 may be a 5G network defined in the 3GPP. Additionally, according to an embodiment, the first communication processor 212 or the second communication processor 214 may establish a communication channel corresponding to another specified band (e.g., approximately 6 GHz or lower) of the bands to be used for wireless communication with the second network 294 and may support 5G network communication through the established communication channel. According to an embodiment, the first communication processor 212 and the second communication processor 214 may be implemented within a single chip or a single package. According to an embodiment, the first communication processor 212 or the second communication processor 214 may be implemented within a single chip or a single package together with the processor 120, the auxiliary processor 123, or the communication module 190.

In the case of transmitting a signal, the first RFIC 222 may convert a baseband signal generated by the first communication processor 212 into a radio frequency (RF) signal of about 700 MHz to about 3 GHz that is used in the first network 292. In the case of receiving a signal, an RF signal may be obtained from the first network 292 (e.g., a legacy network) through an antenna (e.g., the first antenna module 242) and may be pre-processed through an RFFE (e.g., the first RFFE 232). The first RFIC 222 may convert the pre-processed RF signal into a baseband signal so as to be processed by the first communication processor 212.

In the case of transmitting a signal, the second RFIC 224 may convert a baseband signal generated by the first communication processor 212 or the second communication processor 214 into an RF signal (hereinafter referred to as a "5G Sub6 RF signal") in a Sub6 band (e.g., alternatively 6 GHz or lower) used in the second network 294 (e.g., a 5G network). In the case of receiving a signal, the 5G Sub6 RF signal may be obtained from the second network 294 (e.g., a 5G network) through an antenna (e.g., the second antenna module 244) and may be pre-processed through an RFFE (e.g., the second RFFE 234). The second RFIC 224 may convert the pre-processed 5G Sub6 RF signal into a baseband signal so as to be processed by a communication processor corresponding to the 5G Sub6 RF signal from among the first communication processor 212 or the second communication processor 214.

The third RFIC 226 may convert a baseband signal generated by the second communication processor 214 into an RF signal (hereinafter referred to as a "5G Above6 RF signal") in a 5G Above6 band (e.g., approximately 6 GHz to approximately 60 GHz) to be used in the second network 294 (e.g., a 5G network). In the case of receiving a signal, the 5G Above6 RF signal may be obtained from the second network 294 (e.g., a 5G network) through an antenna (e.g., the antenna 248) and may be pre-processed through a third RFFE 236. The third RFIC 226 may convert the preprocessed 5G Above6 RF signal to a baseband signal so as to be processed by the second communication processor 214. According to an embodiment, the third RFFE 236 may be formed as the part of the third RFIC 226.

According to an embodiment, the electronic device 101 may include the fourth RFIC 228 independent of the third RFIC 226 or as at least part thereof. In this case, for transmission of data, the fourth RFIC 228 may convert a baseband signal generated by the second communication processor 214 into an RF signal (hereinafter referred to as an "IF signal") in an intermediate frequency band (e.g., ranging from about 9 GHz to about 11 GHz) and may provide the IF signal to the third RFIC 226. The third RFIC 226 may convert the IF signal to the 5G Above6 RF signal. In the case of receiving a signal, the 5G Above6 RF signal may be received from the second network 294 (e.g., a 5G network) through an antenna (e.g., the antenna 248) and may be converted into an IF signal by the third RFIC 226. The fourth RFIC 228 may convert the IF signal to the baseband signal such that the second communication processor 214 is capable of processing the baseband signal.

According to an embodiment, the first RFIC 222 and the second RFIC 224 may be implemented with a single chip or a part of a single package. According to an embodiment, the first RFFE 232 and the second RFFE 234 may be implemented as a single chip or at least part of a single package. According to an embodiment, at least one of the first antenna module 242 or the second antenna module 244 may be omitted or may be combined with any other antenna module to process RF signals in a plurality of bands.

According to an embodiment, the third RFIC 226 and the antenna 248 may be disposed on the same substrate to form a third antenna module 246. For example, the wireless communication module 192 or the processor 120 may be disposed on a first substrate (e.g., a main PCB). In this case, to form the third antenna module 246, the third RFIC 226 may be disposed in a partial region (e.g., on a lower surface) of a second substrate (e.g., a sub PCB) independent of the first substrate, and the antenna 248 may be disposed in another partial region (e.g., on an upper surface) of the second substrate. As such, the third antenna module 246 may be formed. According to an embodiment, the antenna 248 may include, for example, an antenna array to be used for beamforming. It is possible to reduce the length of the transmission line between the third RFIC 226 and the antenna 248 by positioning the third RFIC 226 and the antenna 248 on the same substrate. The decrease in the transmission line may make it possible to reduce the loss (or attenuation) of a signal in a high-frequency band (e.g., approximately 6 GHz to approximately 60 GHz) used for the 5G network communication due to the transmission line. As such, the electronic device 101 may improve the quality or speed of communication with the second network 294 (e.g., a 5G network).

The second network 294 (e.g., a 5G network) may be used independently of the first network 292 (e.g., a legacy network) (e.g., stand-alone (SA)) or may be used in conjunction with the first network 292 (e.g., non-stand alone (NSA)). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 101 may access the access network of the 5G network and may then access an external network (e.g., Internet) under control of the core network (e.g., an evolved packed core (EPC)) of the legacy network. Protocol information (e.g., LTE protocol information) for communication with the legacy network or protocol information (e.g., New Radio NR protocol information) for communication with the 5G network may be stored in the memory 230 and may be accessed by another component (e.g., the processor 120, the first communication processor 212, or the second communication processor 214).

Figure 3:
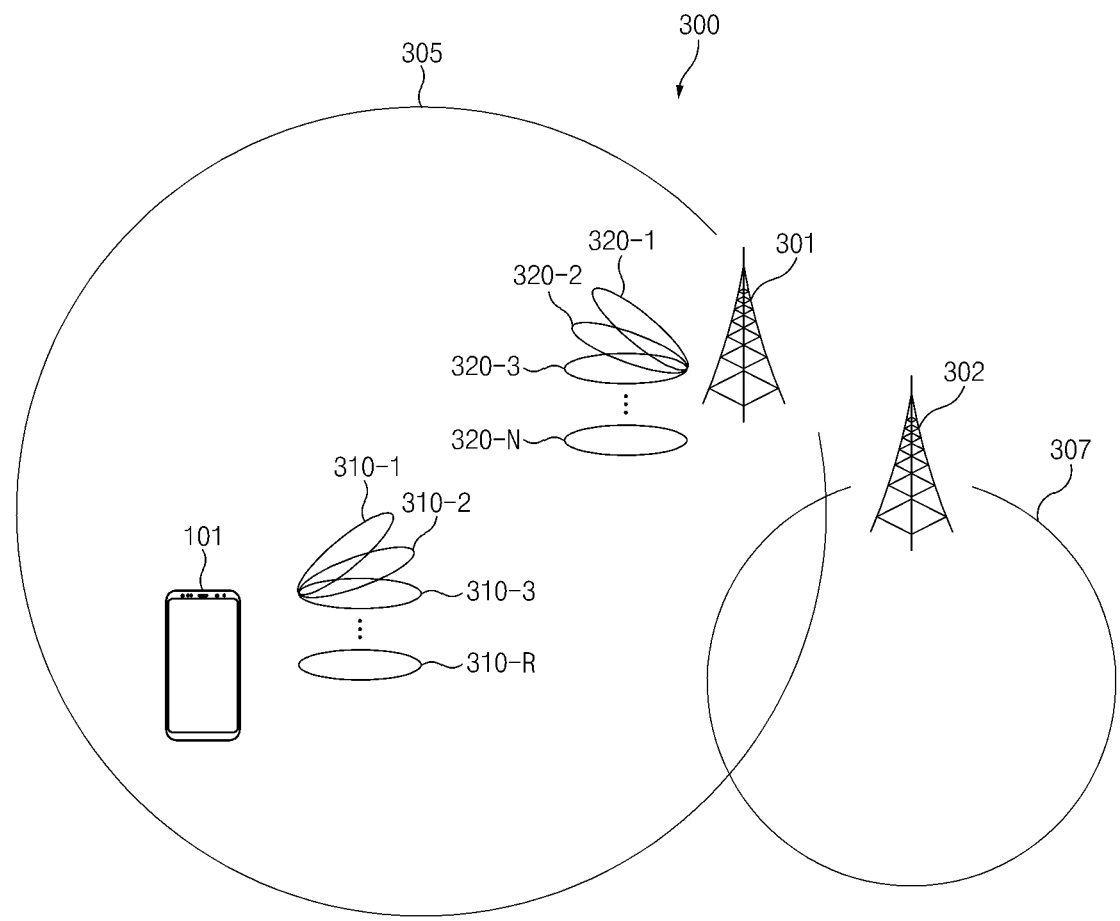
FIG. 3 is a view illustrating an operation of an the electronic device to form a beam, according to an embodiment.

FIG. 3 is a view illustrating an operation of the electronic device 101 to form a beam, according to an embodiment.

Referring to FIG. 3, in a wireless network environment 300 (e.g., the network environment 100 of FIG. 1), the electronic device 101 may be a device employed by a user. For example, the electronic device 101 may be a terminal, user equipment (UE), mobile station, subscriber station, remote terminal, wireless terminal, or user device.

According to an embodiment, base stations 301 and 302 may provide channels for the wireless communication with the electronic device 101. The base stations 301 and 302 may be an access node (AN), radio network controller (RNC) in a radio access network (RAN), eNodeB (eNB), 5G node, transmission/reception point (TRP), or 5th generation NodeB (5GNB).

According to an embodiment, the electronic device 101 may be positioned in a first cell 305 of the first base station 301. The electronic device 101 may establish radio link with the first base station 301 in the first cell 305. The radio link may be a wireless communication path between the electronic device 101 and the first base station 301, which is formed through a wireless resource (e.g., time or frequency). The electronic device 101 may transmit or receive at least one of a control message or data to or from the first base station 301 through the radio link. The principle in which the radio link is established may be based on the radio access network (RAN) standard specifications of 2G, 3G, LTE, or NR specified by 3GPP.

According to an embodiment, the electronic device 101 may include an antenna array (e.g., at least part of the antenna 248 of FIG. 2) including a plurality of antenna elements. In 5G network, the electronic device 101 and the base stations 301 and 302 may use millimeter wave. Because millimeter wave has a high path loss, the electronic device 101 and the base stations 301 and 302 may, by using the antenna array, increase the gain of a signal and/or generate a beam having directivity. For example, when the example illustrated in FIG. 3 is in a downlink (DL) situation, the electronic device 101 may generate a plurality of Rx beams (e.g., 310-1, 310-2, 310-3, . . . , and 310-R, where 'R' is a natural number) having different directions, using at least one antenna element included in the antenna array. In another example, although not illustrated in FIG. 3, in an uplink (UL) situation, the electronic device 101 may generate a plurality of Tx beams having different directions, using at least one antenna element included in the antenna array.

According to an embodiment, the electronic device 101 and the first base station 301 may establish a communication path based on beams. The beam-based communication path may be referred to as a "beam pair link." For example, when the example illustrated in FIG. 3 is in the DL situation, the electronic device 101 may establish a beam pair link, using one Tx beam (e.g., 320-1) of the plurality of Tx beams (e.g., 320-1, 320-2, 320-3, . . . , and 320-N, where 'N' is a natural number) of the first base station 301 having different directions and one Rx beam (e.g., 310-1) of the plurality of Rx beams (e.g., 310-1, 310-2, 310-3, . . . , and 310-R) of the electronic device 101. The electronic device 101 and the first base station 301 may transmit or receive at least one of the control message or the data, using the beam pair link. In another example, although not illustrated in FIG. 3, in the UL situation, the electronic device 101 may establish the beam pair link, using one Rx beam of the plurality of Rx beams of the first base station 301 and one Tx beam of the plurality of Tx beams of the electronic device 101.

According to an embodiment, when the quality of the radio link established between the electronic device 101 and the first base station 301 is not good, the electronic device 101 may determine RLF. For example, when the quality (e.g., RSRP) of a reference signal periodically received from the first base station 301 is less than a threshold or when the decoding of a signal block (e.g., PDCCH) including the reference signal fails, the electronic device 101 may determine that an out-of-sync condition has occurred. When the out-of-sync occurs the specified number of times (e.g., N310), an electronic device may start a first timer (e.g., T310) associated with the RLF. When in-sync does not occur the specified number of times (e.g., N311) before the first timer expires, the electronic device 101 may determine RLF. In other words, when the first timer expires before in-sync occurs the specified number of times, the electronic device 101 may determine RLF.

According to an embodiment, when RLF is determined, the electronic device 101 may perform an RRC re-establishment procedure in another cell. For example, the electronic device 101 may perform the RRC re-establishment procedure in the first cell 305 and may perform the RRC re-establishment procedure in another cell (not illustrated) of the first base station 301. When the RRC re-establishment procedure fails because the electronic device 101 has moved to be within a second cell 307 of another base station (e.g., a second base station 302) adjacent to the first base station 301, the electronic device 101 may detect the second cell 307 via cell search and may perform an RRC establishing procedure with the second base station 302.

According to an embodiment, when the quality of the Tx beam of the first base station 301 forming the beam pair link is not good, the electronic device 101 may determine beam failure. For example, the electronic device 101 may identify monitoring information that is stored in the electronic device 101 in advance or received from the first base station 301. The monitoring information may be RadioLinkMonitoringRS defined in 3GPP. The electronic device 101 may attempt to decode a signal block (e.g., PDCCH) including a reference signal by monitoring the resource (e.g., the index of synchronization signal block (SSB) or channel state information reference signal (CSI-RS)) of the reference signal based on the monitoring information. When the transmission error rate (e.g., block error rate (BLER)) of the signal block is less than a threshold (e.g., Qout_LR) or when the decoding fails, the electronic device 101 may determine beam failure indication. When the number (e.g., BFI_COUNTER) of times that the beam failure indication occurs is equal to or greater than the specified number of times (e.g., beamFailureInstanceMaxCount+1), the electronic device 101 may determine beam failure. Upon the initial beam failure indication, the electronic device 101 may start a second timer (e.g., beamFailureDetectionTimer) associated with the beam failure. When the beam failure indication occurs for a number of times greater than the specified number of times before the second timer expires, the electronic device 101 may determine beam failure. When the second timer expires, the electronic device 101 may initialize the number of times that the beam failure indication occurs.

According to an embodiment, when beam failure is determined, the electronic device 101 may perform beam failure recovery. For example, the electronic device 101 may receive signal blocks using a second Tx beam (e.g., 320-2) having a direction different from the direction of a first Tx beam (e.g., 320-1) of the first base station 301 forming the current beam pair link. When the decoding of the signal blocks received using the second Tx beam is successful or when a transmission error rate is greater than a threshold, the electronic device 101 may determine that the beam failure recovery is successful. In another example, the electronic device 101 may perform the random access procedure with the first base station 301, using the second Tx beam. When the random access procedure is successful, the electronic device 101 may determine that the beam failure recovery is successful.

Figure 4:
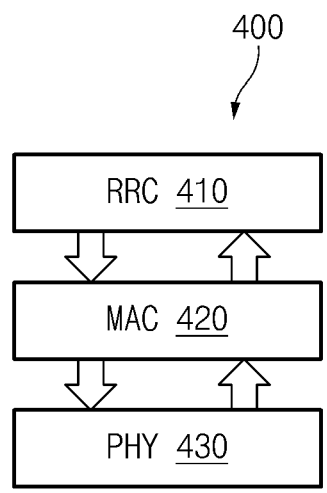
FIG. 4 is a block diagram illustrating a layer architecture of an electronic device, according to an embodiment.

FIG. 4 is a block diagram illustrating a layer architecture 400 of the electronic device 101, according to an embodiment.

Referring to FIG. 4, the layer architecture 400 may be based on the standard specifications of 2G, 3G, LTE, or NR defined by 3GPP. The layer architecture 400 may further include at least another layer (e.g., a radio link control (RLC) layer or a packet data convergence protocol (PDCP) layer) in addition to the layers shown in FIG. 4. The layers included in the layer architecture 400 may be implemented by the electronic device 101 or one or more components (e.g., the processor 120 or the wireless communication module 190 of FIG. 1) of the electronic device 101. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, a physical (PHY) layer 430 may deliver data to an upper layer, using a physical channel. The physical channel may use time and/or frequency as a wireless resource. For example, the physical channel may be modulated using code division multiple access (CDMA), frequency division multiple access (FDMA), time division multiple access (TDMA), orthogonal frequency division multiple access (OFDMA), or single carrier frequency division multiple access (SC-FDMA) in the downlink or uplink. According to an embodiment, the PHY layer 430 may be connected to a medium access control (MAC) layer 420, where the MAC layer 420 is the upper layer, via a transport channel. The PHY layer 430 and the MAC layer 420 may transmit or receive data via the transport channel.

According to an embodiment, the MAC layer 420 may provide data to a radio resource control (RRC) layer 410, where the RRC layer is the upper layer with respect to the MAC layer 420, via a logical channel.

According to an embodiment, the RRC layer 410 may control radio bearer (RB). For example, the electronic device 101 may transmit or receive an RRC message to or from the first base station 301 via the RRC layer 410.

According to an embodiment, the PHY layer 430 may process the signal (or a signal block) received from the first base station 301. When the error rate of the signal block is less than a threshold, the PHY layer 430 may generate (or determine) a beam failure indication. The PHY layer 430 may transmit the signal indicating the beam failure indication to the MAC layer 420.

When the signal indicating the beam failure indication is received, the MAC layer 420 may start the second timer associated with beam failure and may count the number of times that the beam failure indication occurs. According to an embodiment, the second timer and a parameter (e.g., beamFailureInstanceMaxCount) indicating the maximum number of times that the beam failure indication may occur may be received from the RRC layer 410. For example, the electronic device 101 may receive information regarding the second timer and the parameter indicating the maximum number of times that the beam failure indication may occur, from the first base station 301 via the RRC layer 410. When the number of times that the beam failure indication is generated occur for more than the specified number of times, the MAC layer 420 may determine beam failure. When the second timer expires, the MAC layer 420 may initialize the number of times that the beam failure indication occurs. When beam failure is determined, the MAC layer 420 may make a request for beam failure recovery to the PHY layer 430.

According to an embodiment, the PHY layer 430 may perform beam failure recovery through 'M' number of candidate Tx beams (e.g., 320-1, 320-2, 320-3, . . . , and 320-N of FIG. 3, where 'M' is an integer that is equal to less than 'N') selected among the 'N' number of Tx beams of the first base station 301. According to an embodiment, the candidate Tx beams may be selected based on information (e.g., BeamFailureRecoveryConfig) associated with the Tx beams or a threshold stored in the memory (e.g., 130 of FIG. 1) of the electronic device 101. The information associated with Tx beams may be received from the first base station 301 via the RRC layer 410. For example, the information associated with Tx beams may indicate at least one of the list (e.g., candidateBeamRSList) of candidate Tx beams or a threshold (e.g., candidateBeamThreshold) for the quality (e.g., RSRP) of each of the signals corresponding to Tx beams.

According to an embodiment, the PHY layer 430 may identify measurement information. For example, the measurement information may indicate the result of processing the signal block. The PHY layer 430 may notify the RRC layer 410 of RLF based on the measurement information. For example, when the first Tx beam, which has already failed, is the best beam, when beam failure recovery for the best beam other than the first Tx beam fails, or when no measurement value for a plurality of candidate Tx beams is equal to or greater than a threshold, the PHY layer 430 may notify the RRC layer 410 of RLF.

According to an embodiment, the RRC layer 410 may determine RLF in response to receiving data from the PHY layer 430. According to another embodiment, the RRC layer 410 may not immediately determine RLF in response to the data received from the PHY layer 430, but may determine RLF when a specified condition is satisfied after the data is received. For example, when the quality of the signal block generated from the first base station 301 is less than a specified threshold, when the number of times that beam failure occurs is equal to or greater than a specified threshold, when the number of times that beam failure recovery is tried is equal to or greater than a specified threshold, when the second base station 302 is present, or when the quality of a signal block of the second base station 302 is equal to or greater than a specified threshold, the RRC layer 410 may determine RLF.

Figure 5:
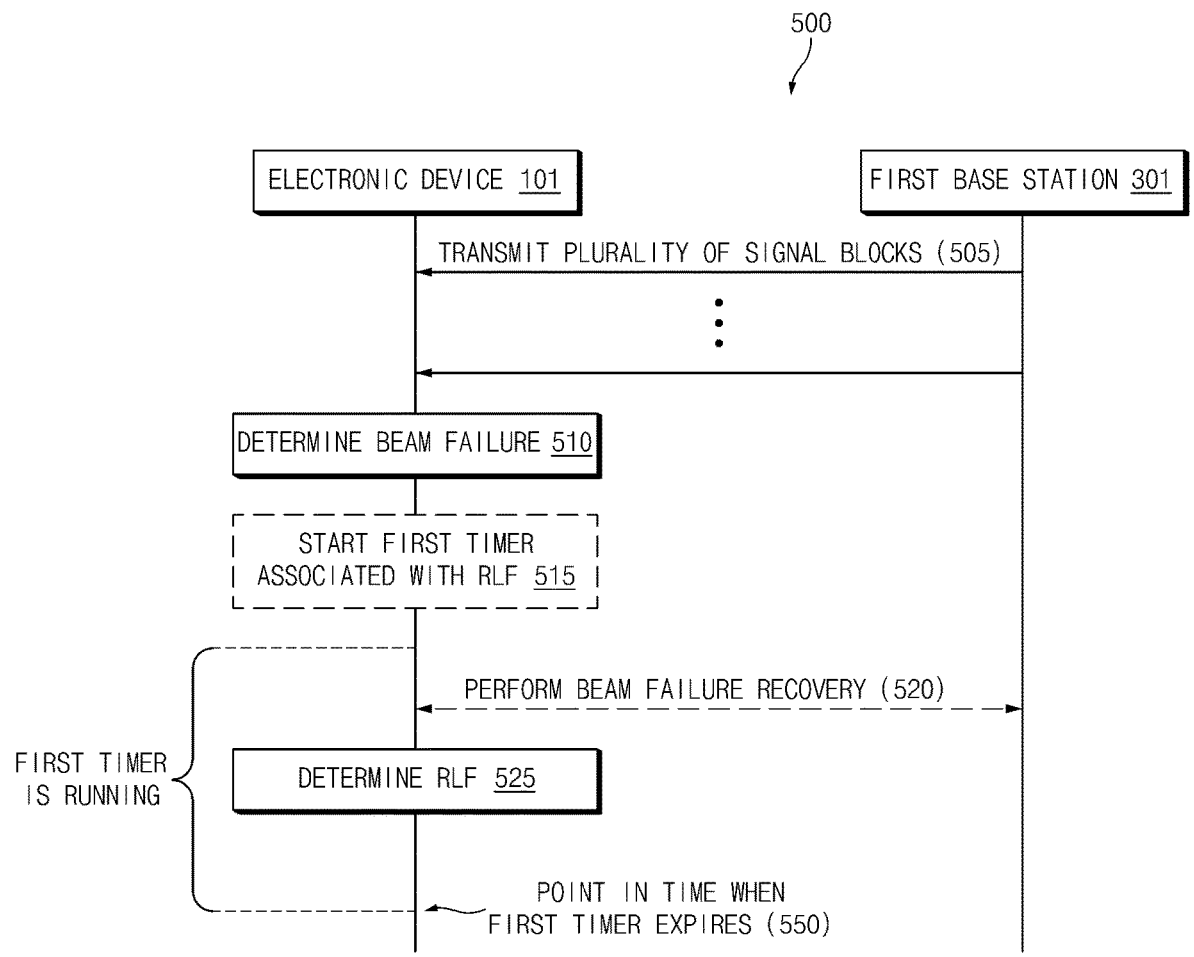
FIG. 5 is a signal flowchart illustrating a signal flow between an electronic device and a first base station 301 for determining RLF, according to an embodiment.

FIG. 5 is a signal flowchart 500 illustrating a signal flow between the electronic device 101 and the first base station 301 for determining RLF, according to an embodiment. In the example of FIG. 5, the operations are performed by the electronic device 101. However, alternatively, the operations illustrated in FIG. 5 may be performed by the processor (e.g., 120 of FIG. 1) or the wireless communication module (e.g., 192 of FIG. 1).

Referring to FIG. 5, it may be assumed for the signal flowchart 500 that the beam pair link between the electronic device 101 and the first base station 301 is previously established. For example, the electronic device 101 may establish a beam pair link, using the first Rx beam (e.g., 310-1 of FIG. 3) among a plurality of Rx beams (e.g., 310-1, 310-2, 310-3, . . . , and 310-R of FIG. 3) of the electronic device 101 and the first Tx beam (e.g., 320-1 of FIG. 3) among a plurality of Tx beams (e.g., 320-1, 320-2, 320-3, . . . , and 320-N) of the first base station 301.

According to an embodiment, in operation 505, the first base station 301 may transmit a plurality of signal blocks to the electronic device 101. For example, the signal blocks may include at least one of PDCCH or SSB, in which a reference signal (RS or CSI-RS) is included.

According to an embodiment, in operation 510, the electronic device 101 may determine beam failure based on the received signal blocks. For example, the electronic device 101 may generate the beam failure indication based on the transmission error rate of the signal blocks or whether decoding fails. When the number of times that the beam failure indication occurs is equal to or greater than a specified number of times, the electronic device 101 may determine beam failure. In this example, the transmission error rate of the signal blocks may be determined upon performing the decoding.

According to an embodiment, in operation 515, the electronic device 101 may start the first timer (e.g., T310) associated with RLF based on determining that the received signal blocks are out-of-sync. For example, when the decoding of the received signal block fails or when the quality of the reference signal is less than a threshold, the electronic device 101 may determine out-of-sync. When the out-of-sync occurs for a specified number of times (e.g., N310), the electronic device 101 may start the first timer. The following operation 520 and operation 525 may be performed while the first timer runs. According to another embodiment, because the beam failure and the out-of-sync may be determining independently, the electronic device 101 may start the first timer before determining the beam failure in operation 510 and may perform operation 510 and operation 515 substantially at the same time.

In operation 520, the electronic device 101 may perform beam failure recovery based on the fact that beam failure is determined (e.g., operation 510). For example, the electronic device 101 may receive the signal blocks via the candidate Tx beams selected among a plurality of Tx beams and then may determine the quality of the received signal blocks or whether the decoding fails. According to another embodiment, because the beam failure and the out-of-sync may be determined independently, the electronic device 101 may perform the beam failure recovery before starting the first timer and may perform operation 515 and operation 520 substantially at the same time.

Although not illustrated in FIG. 5, according to an embodiment, the electronic device 101 may perform the beam failure recovery by using Rx beams (e.g., 310-1, 310-2, 310-3, . . . , and 310-R of FIG. 3) generated by the electronic device 101 before performing the beam failure recovery through candidate Tx beams. For example, the electronic device 101 may receive signal blocks from the first base station 301 via the Rx beam different from the first Rx beam and may perform the beam failure recovery by decoding the received signal blocks.

In operation 525, the electronic device 101 may determine RLF based at least partly on the result of the beam failure recovery before a point in time 550 when the first timer expires. For example, when the quality of the signal blocks received in operation 520 is less than a threshold, when the signal blocks are not received, or when the decoding of the signal blocks fails, the electronic device 101 may determine that the beam failure recovery has failed. According to an embodiment, when the beam failure recovery fails, the electronic device 101 may immediately determine RLF. According to another embodiment, when the beam failure recovery occurs for a specified number of times, the electronic device 101 may determine RLF. Alternatively, even though the beam failure recovery is successful, when beam failure occurs again within a specified time (e.g., before the second timer expires), the electronic device 101 may determine RLF. When the electric field of the cell (e.g., the first cell 305 of FIG. 3) of the first base station 301 is in a poor condition for communication or when the electronic device 101 is positioned in the cell (e.g., the second cell 307 of FIG. 3) of another base station, because the quality of the signal received from the cell of the first base station 301 is poor, the quality of Tx beams may be also poor. In this case, the electronic device 101 may determine that the quality of the radio link as well as the quality of Tx beams are poor, based on the result of the beam failure recovery, thereby reducing the time required until RLF is determined by determining RLF before the first timer expires.

According to an embodiment, the electronic device 101 may determine RLF based on another specified condition without performing the beam failure recovery. In this case, the electronic device 101 may skip operation 520. An embodiment of determining the RLF based on the other specified condition will be described with reference to FIG. 7.

Figure 6:
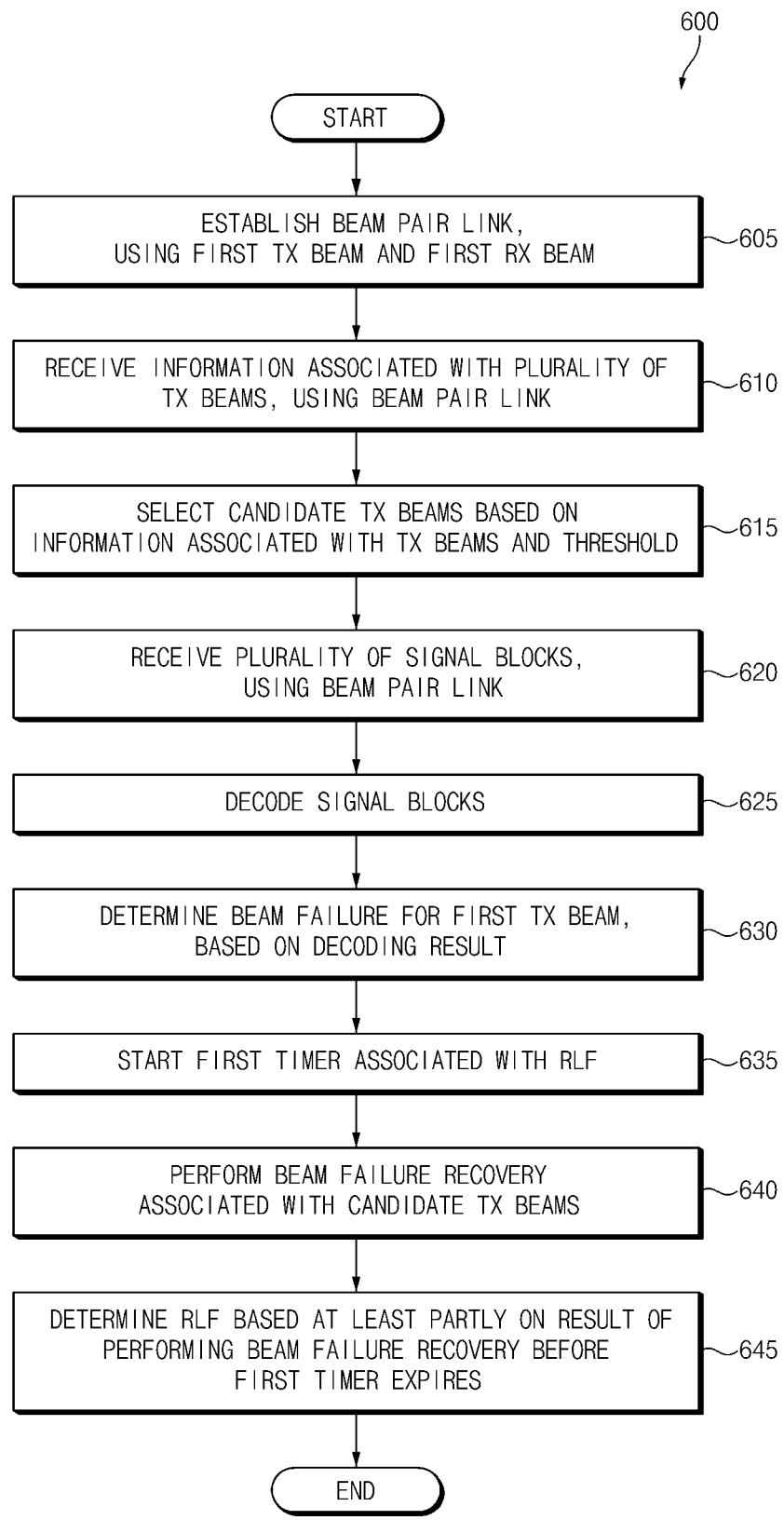
FIG. 6 is an operation flowchart of an electronic device illustrating an operation for determining RLF, according to an embodiment.

FIG. 6 is an operation flowchart 600 of an electronic device (e.g., 101 of FIG. 3) illustrating an operation for determining RLF, according to an embodiment. Hereinafter, the operations illustrated in the operation flowchart 600 to be described and other operation flowcharts may be performed by an electronic device and may be performed by the component of an electronic device. In this case, the processor (e.g., 120 of FIG. 1) may perform operations via the PHY layer 430 or the MAC layer 420 of FIG. 4 by executing instructions stored in the memory (e.g., 130 of FIG. 1).

Referring to FIG. 6, in operation 605, the electronic device may establish the beam pair link, using a first Tx beam (e.g., 320-1 of FIG. 3) among a plurality of Tx beams (e.g., 320-1, 320-2, 320-3, . . . , and 320-N of FIG. 3) having different directions, which are transmitted from a base station (e.g., the first base station 301 of FIG. 3) and a first Rx beam (e.g., 310-1 of FIG. 3) among a plurality of Rx beams (e.g., 310-1, 310-2, 310-3, . . . , and 310-R of FIG. 3) generated by an antenna array (e.g., the antenna 248 of FIG. 2) of an electronic device.

According to an embodiment, in operation 610, the electronic device may receive information (e.g., BeamFailureRecoveryConfig) associated with a plurality of Tx beams from the base station, using the beam pair link. For example, the information associated with the plurality of Tx beams may include at least one of the list (e.g., candidateBeamRSList) of 'M' number of candidate Tx beams, the identifier of Tx beams, and a threshold (e.g., candidateBeamThreshold) for the quality each of the signals corresponding to the Tx beams.

According to an embodiment, in operation 615, the electronic device may select 'I' number of candidate Tx beams, where 'I' is an integer that is equal to or less than 'M,' from the 'M' number candidate Tx beams based on information associated with a plurality of Tx beams and the threshold. According to an embodiment, the electronic device may select the 'I' number of candidate Tx beams based on the threshold (e.g., candidateBeamThreshold) included in the information associated with the plurality of Tx beams or based on a separate threshold stored in advance in the memory (e.g., 130 of FIG. 1) of the electronic device. For example, the electronic device may select the 'I' number of candidate Tx beams by comparing the strength of the signal received via Tx beams with the threshold.

According to an embodiment, in operation 620, the electronic device may receive a plurality of signal blocks, using the beam pair link. For example, the signal blocks may include PDCCH.

According to an embodiment, in operation 625, the electronic device may decode the signal blocks.

According to an embodiment, in operation 630, the electronic device may determine beam failure for the first Tx beam, based on the result of the decoding. For example, when the decoding of the signal blocks fails or when the transmission error rate of the signal blocks is less than a threshold during decoding, the electronic device may generate the beam failure indication. When the beam failure indication occurs for a specified number of times, the electronic device may determine beam failure.

According to an embodiment, in operation 635, the electronic device may start the first timer associated with RLF based on the result of the decoding performed in operation 625. For example, when the decoding of the signal blocks fails, the electronic device may determine the out-of-sync condition. And when the out-of-sync condition occurs for a specified number of times, the electronic device may start the first timer. According to another embodiment, because the beam failure and the out-of-sync condition may be determined independently, the electronic device may start the first timer before operation 630 and may perform operation 630 and operation 635 substantially at the same time.

According to an embodiment, in operation 640, the electronic device may perform beam failure recovery with the 'I' number of candidate Tx beams. Although not illustrated in FIG. 6, according to an embodiment, the electronic device may perform the beam failure recovery associated with the Rx beams of the electronic device before performing the beam failure recovery associated with the candidate Tx beams. When the beam failure recovery associated with the Rx beams fails, the electronic device may perform the beam failure recovery associated with the candidate Tx beams transmitted by a base station (e.g., the first base station 301).

According to an embodiment, in operation 645, the electronic device may determine RLF based at least partly on the result of performing the beam failure recovery before the first timer expires. For example, when the beam failure recovery occurs, the electronic device may immediately determine RLF. In addition, when beam failure occurs again within a predetermined time period after beam failure recovery succeeded, the electronic device may determine RLF.

Figure 7:
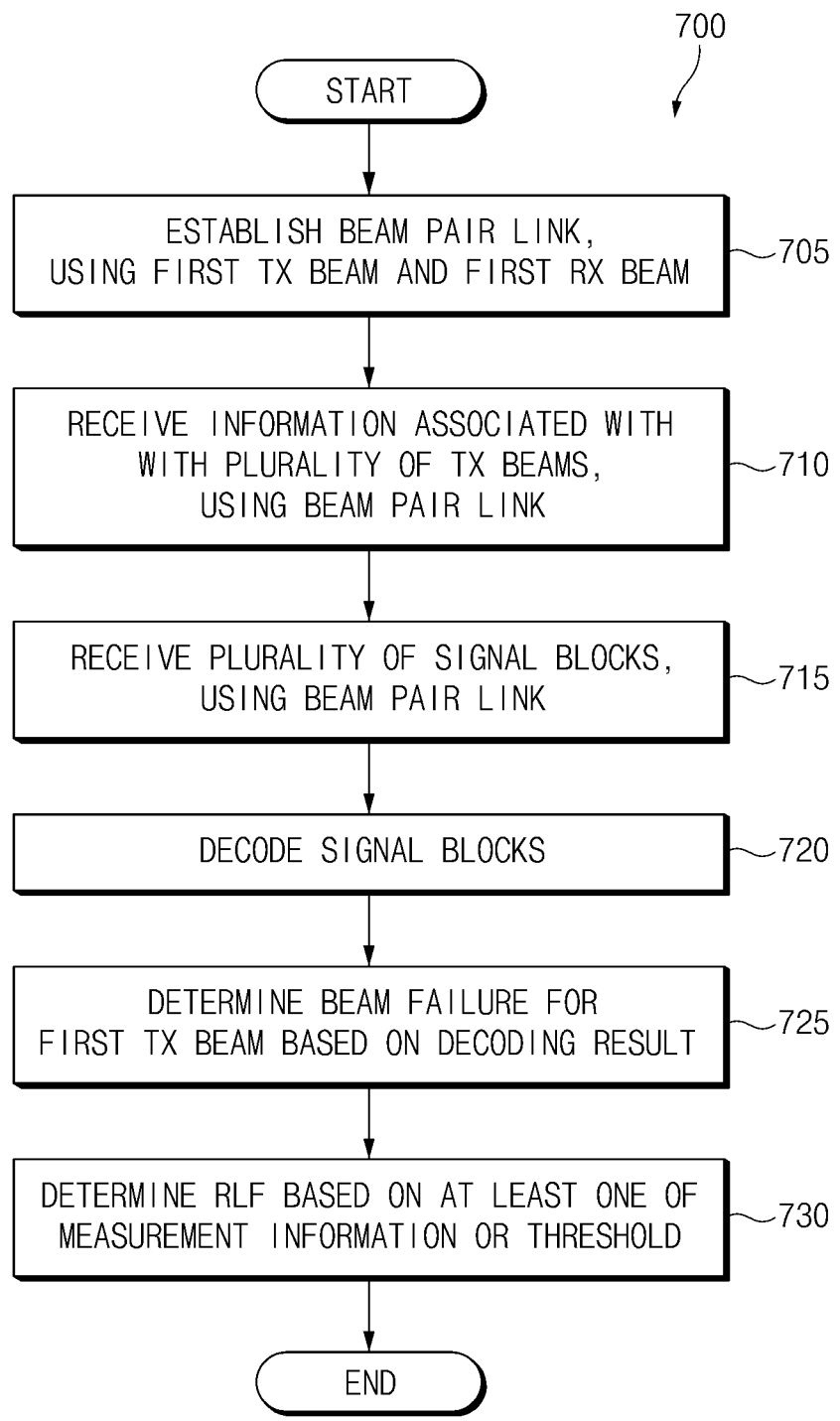
FIG. 7 is an operation flowchart of an electronic device illustrating an operation for determining RLF using measurement information, according to an embodiment.

FIG. 7 is an operation flowchart 700 of an electronic device (e.g., 101 of FIG. 1) illustrating an operation for determining RLF using measurement information, according to an embodiment. Hereinafter, the description about operations that are the same as or similar to the operations of FIG. 6 may be omitted.

Referring to FIG. 7, in operation 705, the electronic device may establish the beam pair link, using a first Tx beam (e.g., 320-1 of FIG. 3) among a plurality of Tx beams (e.g., 320-1, 320-2, 320-3, . . . , and 320-N of FIG. 3) having different directions, which are transmitted from a base station (e.g., the first base station 301 of FIG. 3) and a first Rx beam (e.g., 310-1 of FIG. 3) among a plurality of Rx beams (e.g., 310-1, 310-2, 310-3, . . . , and 310-R of FIG. 3) generated by an antenna array (e.g., 248 of FIG. 2) of an electronic device (e.g., operation 605 of FIG. 6).

According to an embodiment, in operation 710, the electronic device may receive information associated with a plurality of Tx beams from the base station, using the beam pair link (e.g., operation 610 of FIG. 6).

According to an embodiment, in operation 715, the electronic device may receive a plurality of signal blocks, using the beam pair link (e.g., operation 620 of FIG. 6).

According to an embodiment, in operation 720, the electronic device may decode the signal blocks (e.g., operation 625 of FIG. 6).

According to an embodiment, in operation 725, the electronic device may determine beam failure for the first Tx beam based on the result (e.g., the detection of signal block transmission error rate less than a threshold) of the decoding (e.g., operation 630 of FIG. 6).

According to an embodiment, in operation 730, the electronic device may determine RLF based on at least one of measurement information or a threshold. According to an embodiment, the measurement information may indicate the quality (e.g., BLER) of signal blocks (e.g., SSB, or physical broadcast channel (PBCH)) corresponding to a plurality of Tx beams or the quality (e.g., RSRP) of a reference signal (e.g., CSI-RS). For example, the measurement information may be determined after the decoding in operation 720 is performed. For example, the threshold may be a separate threshold stored in the memory of the electronic device in advance or a threshold (e.g., candidateBeamThreshold) indicated by the information received in operation 710.

According to an embodiment, when the first Tx beam is the best beam, the electronic device may determine RLF. The best beam may refer to a beam in which the quality of the signal block or the reference signal is the highest. In the case where the first Tx beam is the best beam, and beam failure has already occurred in the first Tx beam, it may imply that beam failure recovery for another Tx beams will not be successful. As such, the electronic device may determine RLF without performing beam failure recovery.

According to another embodiment, when beam failure recovery for the best beam among other Tx beams other than the first Tx beam fails, the electronic device may determine RLF, thereby preventing unnecessary beam failure recovery from being repeatedly performed.

According to another embodiment, when no measurement value for a plurality of Tx beams or a plurality of candidate Tx beams indicated by a list (e.g., candidateBeamRSList) is equal to or greater than the threshold, the electronic device may determine RLF.

According to another embodiment, when two or more conditions described above are satisfied, the electronic device may determine RLF.

Figure 8:
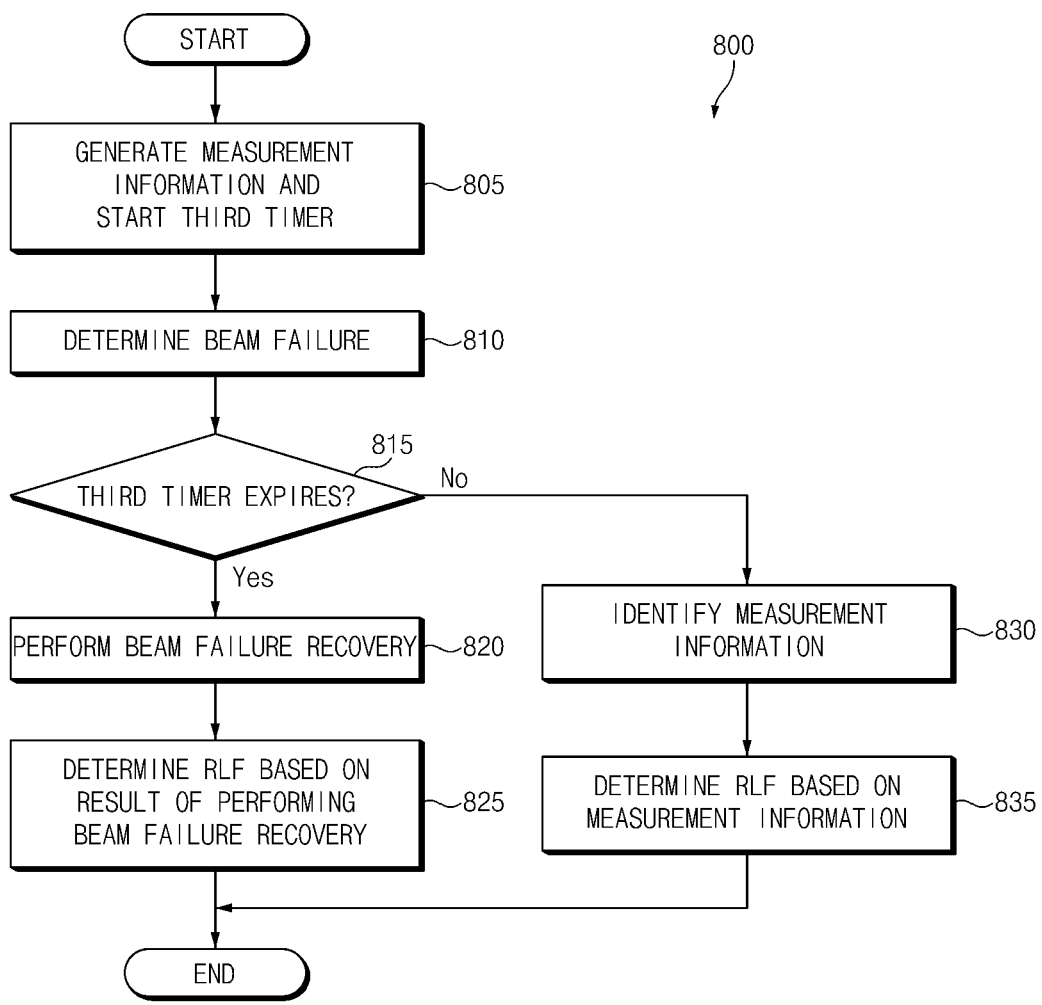
FIG. 8 is an operation flowchart of an electronic device illustrating an operation for determining RLF depending on whether a third timer expires, according to an embodiment.

FIG. 8 is an operation flowchart 800 of an electronic device (e.g., 101 of FIG. 1) illustrating an operation for determining RLF depending on whether a third timer expires, according to an embodiment.

In the embodiment according to FIG. 7, because the quality of Tx beams may be changed depending on the electric field of the cell (e.g., 305 of FIG. 3) of the base station or the mobility of the electronic device, the reliability of measurement values indicated by measurement information may be reduced as time goes on. The electronic device may generate the third timer for the measurement information to determine the reliability for the measurement information.

In operation 805, the electronic device may generate the measurement information and may start the third timer for the generated measurement information. For example, the electronic device may measure the quality (e.g., BLER) of signal blocks or the quality (e.g., RSRP) of a reference signal, based on at least one of the receiving of the signal blocks in operation 715 of FIG. 7 or the result of performing the decoding in operation 725.

In operation 810, the electronic device may determine beam failure (e.g., operation 725 of FIG. 7).

In operation 815, the electronic device may identify whether the third timer expires, in response to the fact that the beam failure is determined. Because the reliability of the measurement values indicated by the measurement information is reduced when the third timer expires, in operation 820, the electronic device may perform beam failure recovery without using the measurement information (e.g., operation 640 of FIG. 6). In operation 825, the electronic device may determine RLF based on the result of performing the beam failure recovery (e.g., operation 645 of FIG. 6).

When the third timer is not expired, in operation 830, the electronic device may identify the measurement information. In operation 835, the electronic device may determine RLF based on the identified measurement information (e.g., operation 730 of FIG. 7).

Figure 9:
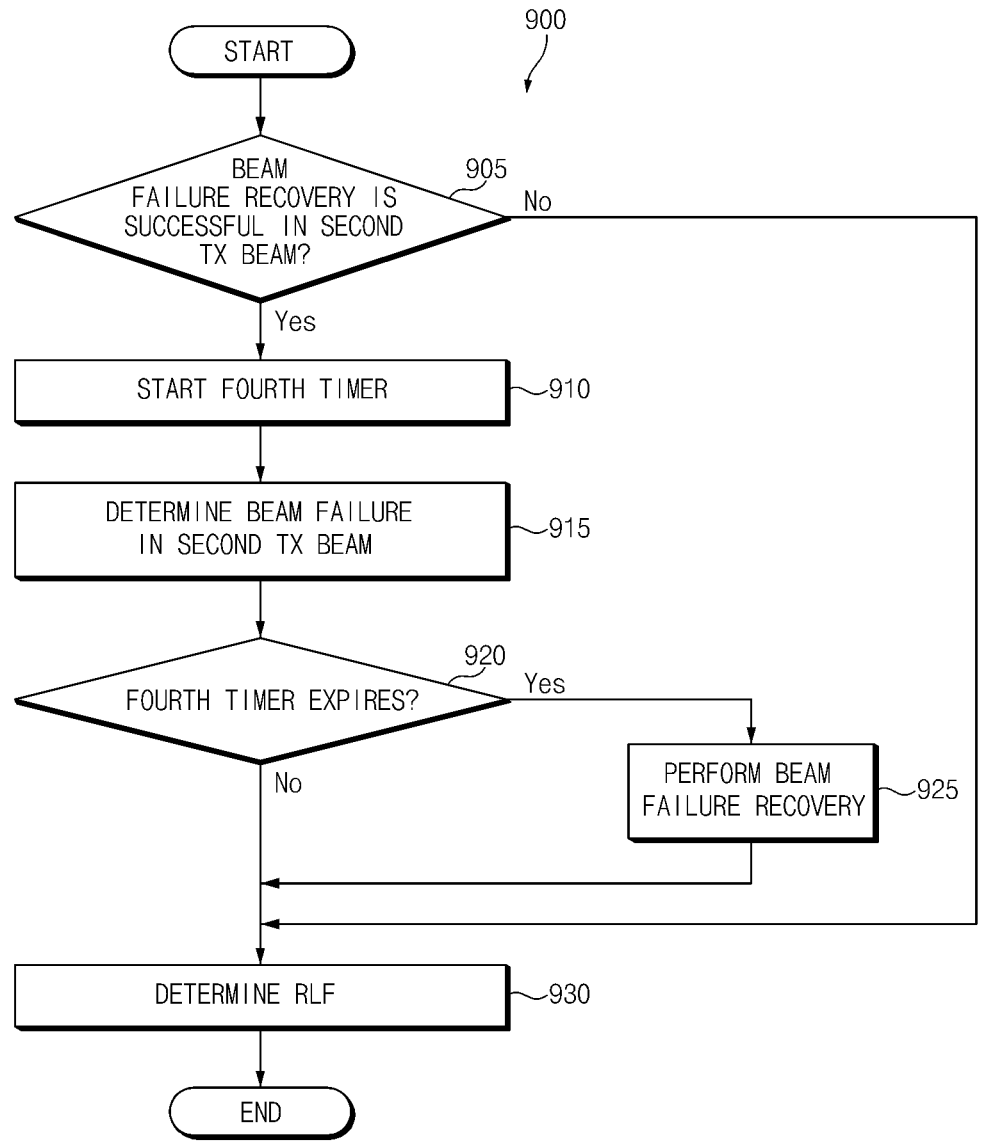
FIG. 9 is an operation flowchart of an electronic device illustrating an operation for determining RLF after beam failure recovery is successful, according to an embodiment.

FIG. 9 is an operation flowchart 900 of the electronic device 101 illustrating an operation for determining RLF after beam failure recovery is successful, according to an embodiment. Operations illustrated in FIG. 9 may be an embodiment of operation 640 and operation 645 of FIG. 6 or may be an embodiment of operation 820 and operation 825 of FIG. 8.

Referring to FIG. 9, in operation 905, an electronic device may identify whether beam failure recovery is successful in a second Tx beam. The second Tx beam may be a Tx beam having a direction different from the direction of the first Tx beam. For example, the second Tx beam may be included in a plurality of Tx beams (e.g., 320-1, 320-2, 320-3, . . . , and 320-N of FIG. 3) generated from a base station (e.g., 301 of FIG. 3) or included in the candidate Tx beams selected among the plurality of Tx beams. For example, the electronic device may receive signal blocks via the second Tx beam and may determine whether the beam failure recovery is successful, based on the quality of the received signal blocks or whether decoding fails. In another example, when the signal block is received, the electronic device may determine that the beam failure recovery is successful.

When the beam failure recovery fails, in operation 930, the electronic device may determine RLF (e.g., operation 645 of FIG. 6).

When the beam failure recovery is successful, in operation 910, the electronic device may start a fourth timer.

In operation 915, the electronic device may determine beam failure in the second Tx beam.

In operation 920, the electronic device may identify whether the fourth timer expires, in response to the fact that the beam failure is determined in the second Tx beam.

When the beam failure is determined in the second Tx beam before the second timer expires, this means that the quality of the radio link in the second Tx beam is bad. Hence, the electronic device may determine RLF in operation 930 without performing any further beam failure recovery.

When the beam failure is determined at a point when the fourth timer is already expired, in operation 925, the electronic device may perform beam failure recovery via another Tx beams other than the first Tx beam and the second Tx beam. In operation 930, the electronic device may determine RLF based on the result of the beam failure recovery.

Figure 10:
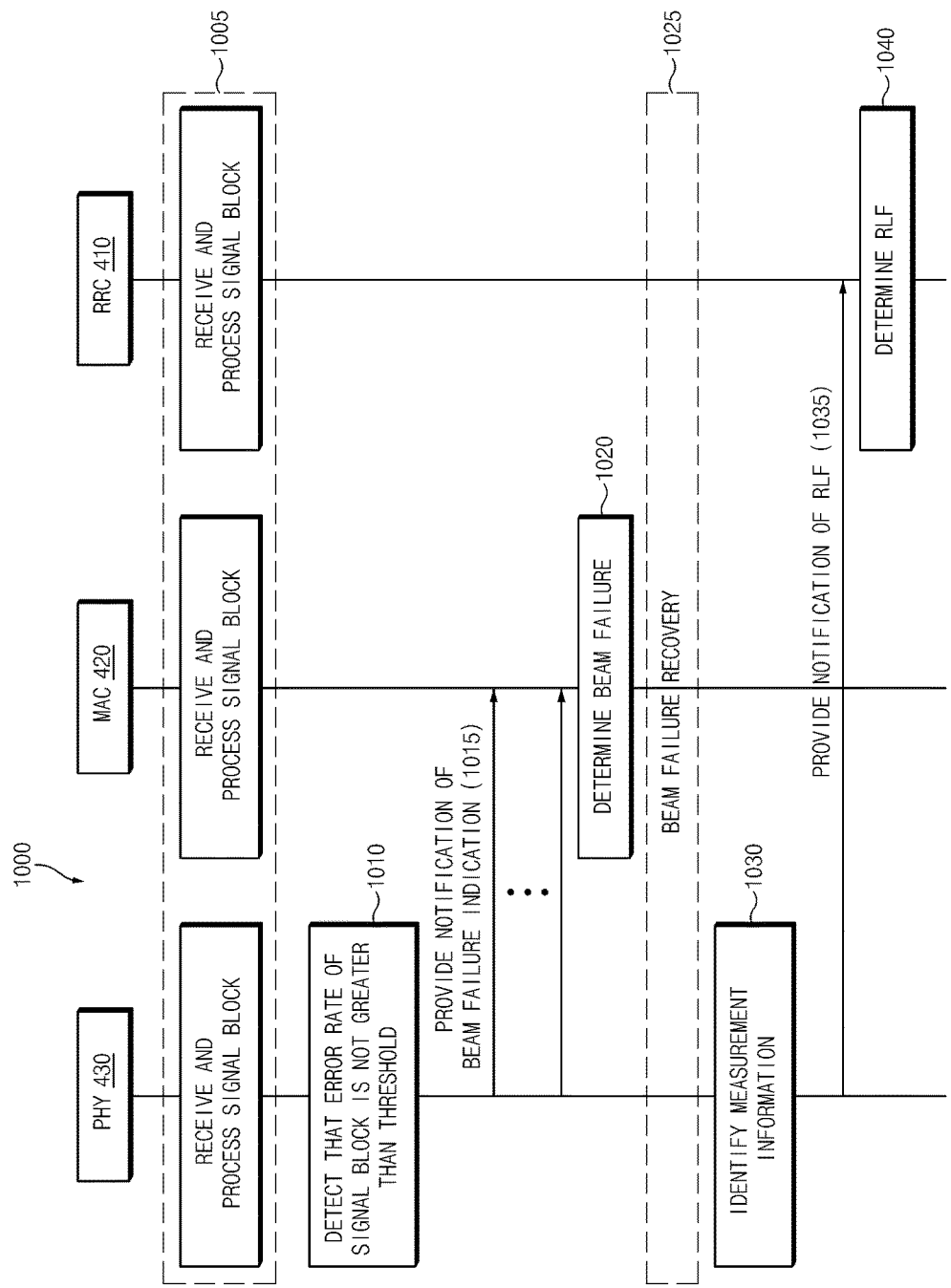
FIG. 10 is a signal flowchart illustrating a signal flow between layers for determining RLF.

FIG. 10 is a signal flowchart illustrating a signal flow 1000 between layers 410, 420, and 430 for determining RLF. Operations illustrated in FIG. 10 may be an embodiment of operation 725 and operation 730 of FIG. 7.

Referring to FIG. 10, in operation 1005, the RRC layer 410, the MAC layer 420, and the PHY layer 430 may receive a signal block from a base station (e.g., the first base station 301 of FIG. 3) via a first Tx beam and may process the received signal block. According to an embodiment, the processing of the signal block may be performed substantially at the same time or may be performed sequentially.

In operation 1010, the PHY layer 430 may detect that the transmission error rate of signal blocks received via the first Tx beam is not greater than a first threshold. When the transmission error rate is not greater than the first threshold, the PHY layer 430 may determine a beam failure indication.

In operation 1015, the PHY layer 430 may notify the MAC layer 420 of the beam failure indication. Whenever the beam failure indication is determined, the PHY layer 430 may notify the MAC layer 420 of the beam failure indication. For example, the PHY layer 430 may transmit data or a signal indicating the beam failure indication via a transport channel.

In operation 1020, the MAC layer 420 may determine beam failure (e.g., operation 510 of FIG. 5). When the number (e.g., BFI_COUNTER) of times that the beam failure indication occurs is equal to or greater than the specified number of times (e.g., beamFailureInstanceMax-Count+1), the MAC layer 420 may determine the beam failure.

In operation 1025, the RRC layer 410, the MAC layer 420, and the PHY layer 430 may perform beam failure recovery in response to the fact that the beam failure is determined (e.g., operation 520 of FIG. 5).

In operation 1030, the PHY layer 430 may identify the measurement information (e.g., operation 730 of FIG. 7).

In operation 1035, the PHY layer 430 may notify the RRC layer 410 of RLF based on the identified measurement information. For example, when the first Tx beam is the best beam, when the beam failure recovery for the best beam among other Tx beams other than the first Tx beam fails, or when no measurement value for a plurality of candidate Tx beams is equal to or greater than a threshold, the PHY layer 430 may notify the RRC layer 410 of RLF.

In operation 1040, the RRC layer 410 may determine RLF in response to receiving data from the PHY layer 430. Although not illustrated in FIG. 10, the RRC layer 410 may perform an RRC re-establishment procedure or cell search in response to the fact that RLF is determined.

Figure 11:
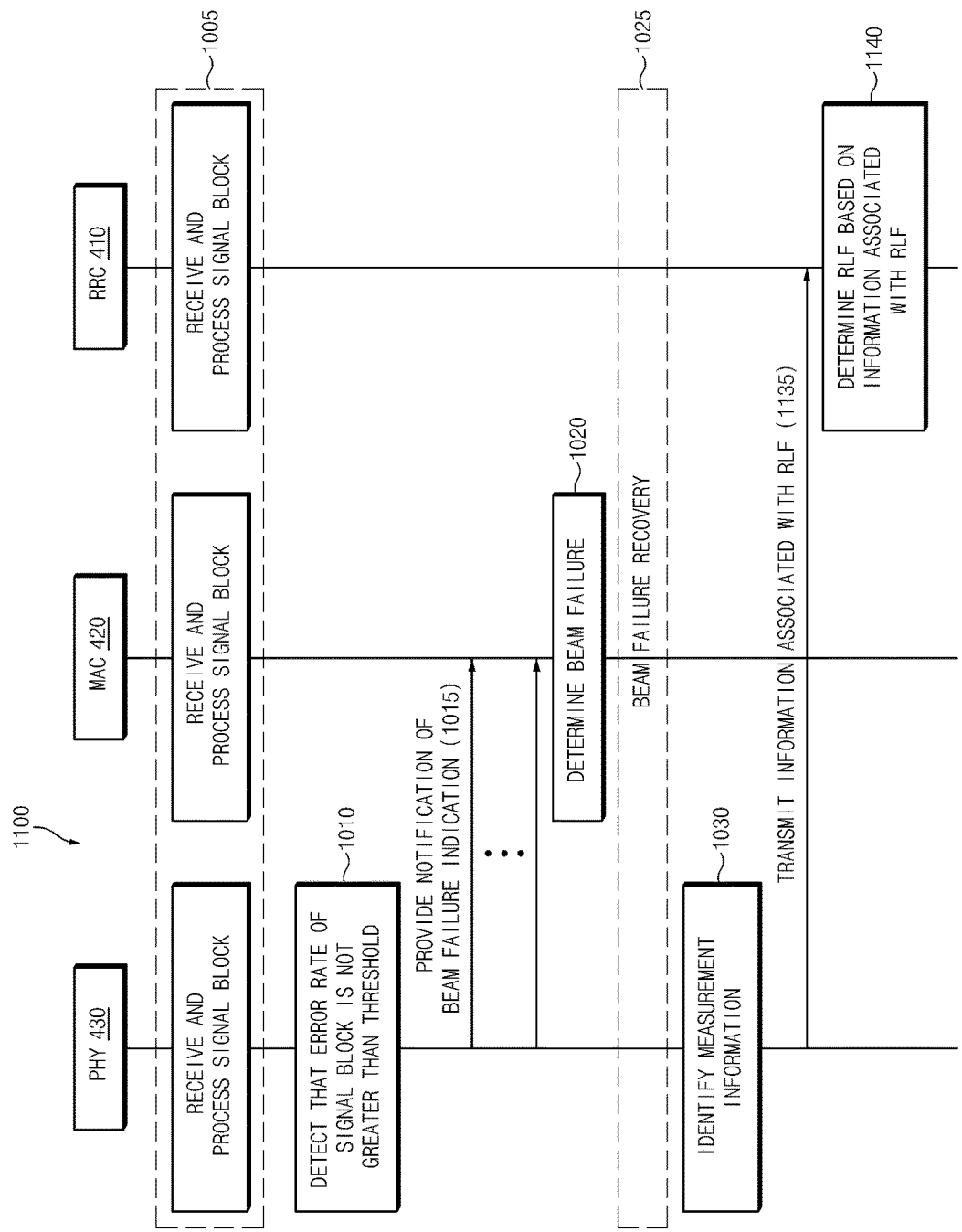
FIG. 11 is a signal flowchart illustrating another example of a signal flow between layers for determining RLF.

FIG. 11 is a signal flowchart illustrating another example of a signal flow 1100 between layers 410, 420, and 430 for determining RLF. Hereinafter, the description about operations referred to by reference numerals of FIG. 10 among the operations illustrated in FIG. 11 may be omitted.

Referring to FIG. 11, while the quality for Tx beams may be bad, the quality of radio link may be good, and the RRC layer 410 may determine RLF in consideration of information associated with the RLF, unlike the operations illustrated in FIG. 10. For example, in operation 1135, the PHY layer 430 may transmit the information associated with RLF to the RRC layer 410. For example, the information associated with RLF may include at least one of the quality of the signal block (or signal) generated from the base station (e.g., 301 of FIG. 3), the number of times that beam failure occurs, the number of times that beam failure recovery is tried, whether a surrounding base station (e.g., 302 of FIG. 3) is present, or the quality of the signal block (or signal) of the surrounding base station.

In operation 1140, the RRC layer 410 may determine RLF based on the information associated with the RLF. For example, when the quality of the signal block generated from the first base station 301 is less than a specified threshold, when the number of times that beam failure occurs is equal to or greater than a specified threshold, when the number of times that the beam failure recovery is tried is equal to or greater than a specified threshold, when the second base station 302 is present, or when the quality of a signal block of the second base station 302 is equal to or greater than a specified threshold, the RRC layer 410 may determine RLF.

Figure 12:
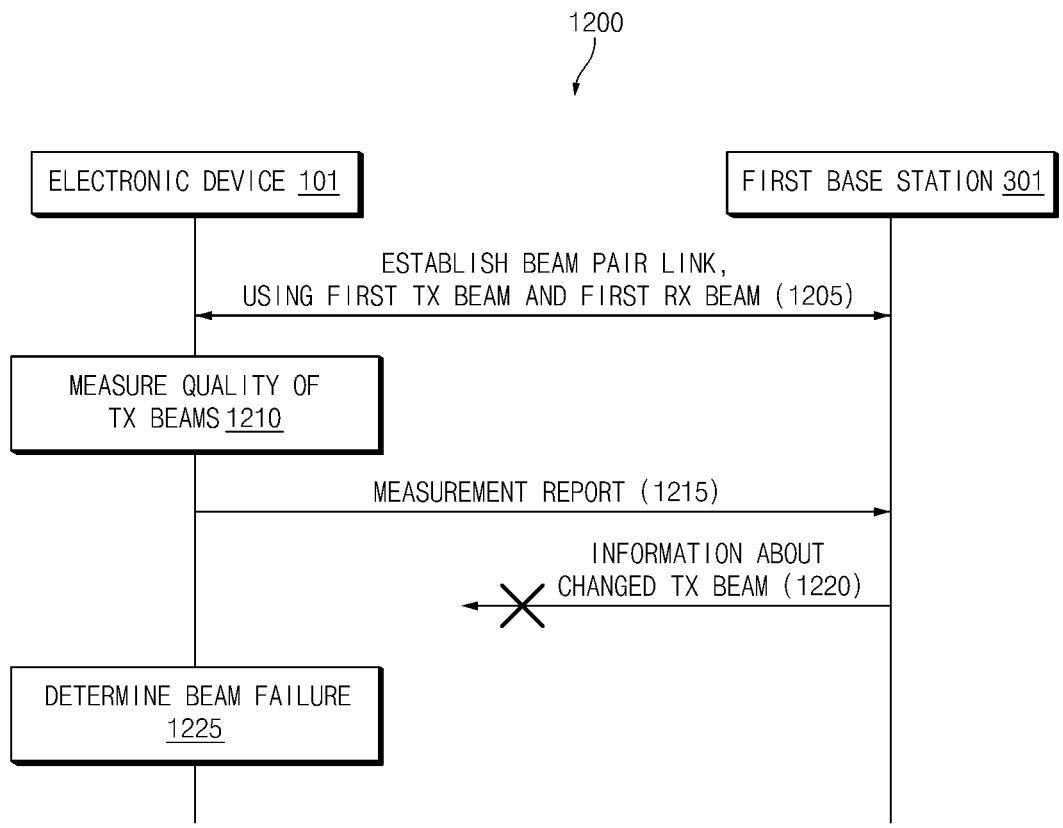
FIG. 12 is a signal flowchart illustrating a signal flow for determining beam failure, according to an embodiment.

FIG. 12 is a signal flowchart 1200 illustrating a signal flow for determining beam failure, according to an embodiment.

Referring to FIG. 12, in operation 1205, the electronic device 101 may establish a beam pair link, using the first Tx beam (e.g., 320-1 of FIG. 3) generated from the first base station 301 and the first Rx beam (e.g., 310-1 of FIG. 3) generated by the electronic device 101 (e.g., operation 605 of FIG. 6). The electronic device 101 may transmit or receive at least one of a control message or data via the established beam pair link.

In operation 1210, the electronic device 101 may measure the quality of Tx beams (e.g., 320-1, 320-2, 320-3, . . . , and 320-N of FIG. 3). For example, the electronic device 101 may measure the quality (e.g., BLER) of signal blocks (e.g., SSB or PBCH) for a plurality of Tx beams or the quality (e.g., RSRP) of a reference signal (e.g., CSI-RS). The electronic device 101 may determine that the quality of a second Tx beam (e.g., 320-2 of FIG. 3) having the direction different from the direction of a first Tx beam is higher than the quality of the first Tx beam, based on the measurement result.

In operation 1215, the electronic device 101 may transmit a measurement report message indicating the measurement values to the first base station 301. For example, the measurement report message may include the measurement values or may include information indicating that the quality of the second Tx beam is higher than the quality of the first Tx beam.

In accordance with the standard specification of 3GPP, the first base station 301 may change the Tx beam to the second Tx beam from the first Tx beam, based on the received measurement report message. The first base station 301 may notify the electronic device 101 of information about the changed Tx beam. For example, the information about the changed Tx beam may include transmission configuration indication (TCI)) about DL transmission included in the signal block (e.g., PDCCH). The first base station 301 may notify the electronic device 101 of the information about the changed Tx beam by transmitting the signal block.

According to an embodiment, when the traffic of the first base station 301 is overloaded or the electric field of the cell of the first base station 301 (e.g., 305 of FIG. 3) is bad, in operation 1220, the electronic device 101 may fail to receive the information about the changed Tx beam from the first base station 301. Because the quality of the beam pair link (or radio link) may decrease when the electronic device 101 waits until the information about the changed Tx beam is received, the electronic device 101 may determine beam failure in operation 1225 without waiting for the information about the changed Tx beam. For example, when a specified time elapses after the electronic device 101 transmits the measurement report message or when beam failure indication occurs in the first Tx beam after the electronic device 101 transmits the measurement report message, the electronic device 101 may determine beam failure.

Although not illustrated in FIG. 12, the electronic device 101 may perform beam failure recovery in the second Tx beam, in response to the fact that the beam failure is determined.

Figure 13:
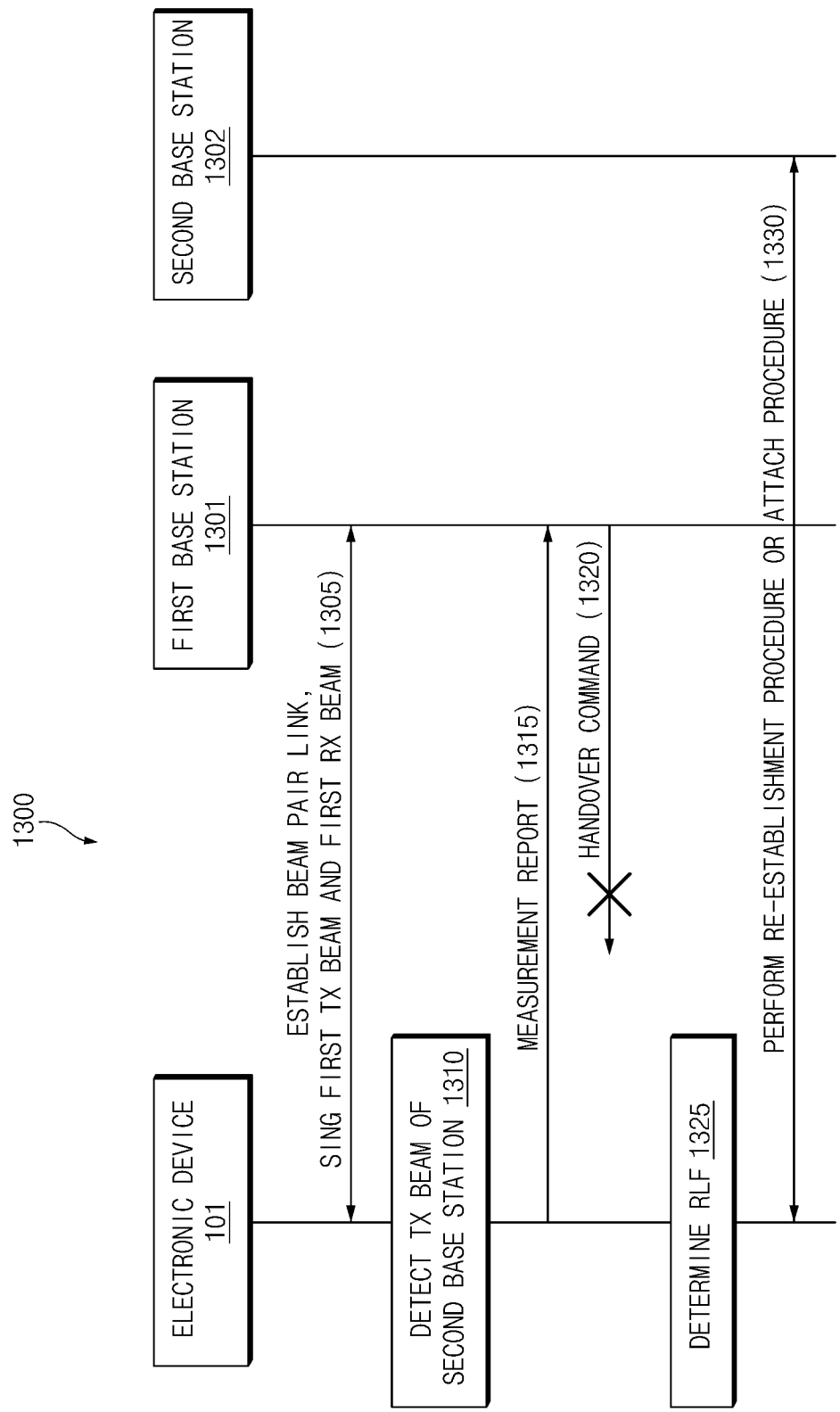
FIG. 13 is a signal flowchart illustrating a signal flow for performing a RRC re-establishment procedure or an attach procedure with another base station, according to an embodiment.

FIG. 13 is a signal flowchart 1300 illustrating a signal flow for performing a re-establishment procedure or an attach procedure with another base station (e.g., 1302), according to an embodiment.

Referring to FIG. 13, in operation 1305, the electronic device 101 may establish a beam pair link, using a first Tx beam generated from a first base station 1301 (e.g., the first base station 301 of FIG. 3) and a first Rx beam generated by the electronic device 101 (e.g., operation 1205 of FIG. 12).

In operation 1310, the electronic device 101 may detect a Tx beam of a second base station 1302 (e.g., the second base station 302 of FIG. 3). For example, the electronic device 101 may measure the quality of the Tx beam at the intra frequency and the inter frequency at a specified period or may detect the Tx beam of the second base station 1302 through cell search. For example, the specified period may be determined based on measurement time information (e.g., SS/PBCH block measurement time configuration (SMTC)) received from the first base station 1301. The electronic device 101 may determine that the quality of the Tx beam of the detected second base station 1302 is better than the quality of the first Tx beam.

In operation 1315, the electronic device 101 may transmit the measurement report message including the measurement value for the Tx beam of the second base station 1302, to the first base station 1301.

In accordance with the standard specification of 3GPP, the first base station 1301 may transmit, to the electronic device 101, a handover command message for changing the serving base station from the first base station 1301 to the second base station 1302, based on the received measurement report message. According to an embodiment, when the traffic of the first base station 1301 is overloaded or the electric field of the cell of the first base station 1301 (e.g., 305 of FIG. 3) is bad, the electronic device 101 may fail to receive the handover command message from the first base station 1301. In another example, when the problem of backhaul, scheduling, or data load balancing occurs or when the value included in the measurement report message does not satisfy a specified condition even though the electronic device 101 is positioned at the cell boundary for handover, in operation 1320, the first base station 1301 may fail to transmit a handover command to the electronic device 101. Because the quality of the radio link may decrease when the electronic device 101 waits until a handover command message is received, the electronic device 101 may perform the RRC re-establishment procedure or attach procedure with the second base station 1302 without waiting for the handover command message.

For example, when the beam failure for the first Tx beam is determined in operation 1325, the electronic device 101 may determine RLF without performing beam failure recovery and then may perform the RRC re-establishment procedure or attach procedure in operation 1330.

As described above, an electronic device may include housing, at least one antenna array disposed inside the housing or constituting as a part of the housing and including a plurality of antenna elements, a processor forming a plurality of reception beams (Rx beams) having different directions, using the antenna array, and a memory operatively connected to the processor and storing a threshold. The memory may store instructions that, when executed, cause the processor to establish a beam pair link, using a first Tx beam included in a plurality of transmission beams (Tx beams) having different directions transmitted from a base station, and a first Rx beam included in the plurality of Rx beams, to receive information associated with an 'M' number of candidate Tx beams from among the plurality of Tx beams, using the beam pair link, where the first Tx beam is excluded from the 'M' number of candidate Tx beams, to select an 'I' number of candidate Tx beams among the 'M' number of candidate Tx beams based on the information associated with the 'M' number of candidate Tx beams and the threshold, to receive a plurality of first signal blocks, using the beam pair link, to perform first decoding of the first signal blocks, to determine beam failure for the first Tx beam based at least partly on the result of the first decoding, to start a first timer associated with radio link failure (RLF) based at least partly on the result of the first decoding, to perform beam failure recovery associated with the 'I' number of candidate Tx beams based on determining that the beam failure has occurred, using the first Rx beam, and to determine the RLF associated with the base station before the first timer expires, based at least partly on the result of performing the beam failure recovery. The 'M' may be an integer of one or more, and the T may be an integer of zero or more.

According to an embodiment, the instructions may cause the processor to measure qualities of the first signal blocks, during the first decoding and to determine the beam failure based at least partly on the qualities.

According to an embodiment, the instructions may cause the processor to receive second signal blocks, using at least one Rx beam in a direction different from a direction of the first Rx beam and to perform second decoding of the second signal blocks, before performing the beam failure recovery.

According to an embodiment, the instructions may cause the processor to perform the beam failure recovery based at least partly on the result of the second decoding.

According to an embodiment, the instructions may cause the processor to receive a plurality of second signal blocks via a second Tx beam in a direction different from a direction of the first Tx beam, from the base station, to perform the beam failure recovery based at least partly on the received second signal blocks, to start a second timer when the beam failure recovery is successful, to perform second decoding of the second signal blocks, to determine beam failure for the second Tx beam based at least partly on the result of the second decoding, and to determine the RLF associated with the base station before the second timer expires.

According to an embodiment, the instructions may cause the processor to determine that the beam failure recovery has failed and to determine the RLF associated with the base station based at least partly on the failure, when the second signal blocks are not received from the base station.

According to an embodiment, the memory may further store count information indicating a specified number of times associated with the beam failure recovery. The instructions may cause the processor to perform the beam failure recovery using the T number of candidate Tx beams, to determine that an attempt for the beam failure recovery has failed when a signal block associated with the beam failure recovery is not received from the base station, to determine that the beam failure recovery has failed when the attempt for the beam failure recovery fails for the specified number of times or more, and to determine the RLF associated with the base station based at least partly on the failure of the beam failure recovery.

As described above, an electronic device may include housing, at least one antenna array disposed inside the housing or constituting as a part of the housing and including a plurality of antenna elements, a processor forming a plurality of Rx beams having different directions, using the antenna array, and a memory operatively connected with the processor. The memory may store instructions that, when executed, cause the processor to establish a beam pair link, using a first Tx beam included in a plurality of Tx beams having different directions transmitted from a base station, and a first Rx beam included in the plurality of Rx beams, to receive information associated with the plurality of Tx beams, using the beam pair link, to receive a plurality of first signal blocks, using the beam pair link, to perform first decoding of the first signal blocks, to determine beam failure for the first Tx beam based at least partly on the result of the first decoding, to identify measurement information about the plurality of Tx beams; and to determine RLF associated with the base station based on the measurement information and the information associated with the Tx beams. The information associated with the plurality of Tx beams may include at least one of a list of candidate Tx beams among the plurality of Tx beams or a threshold associated with qualities of the plurality of Tx beams.

According to an embodiment, the instructions may cause the processor to measure qualities of the first signal blocks, during the first decoding and to determine the beam failure based at least partly on the qualities.

According to an embodiment, the instructions may cause the processor to determine the RLF when the first Tx beam is determined as a best Tx beam based on the measurement information or when no candidate Tx beam has a quality equal to or greater than the threshold.

According to an embodiment, the instructions may cause the processor to generate the measurement information by measuring the qualities of the Tx beams, to start a timer associated with the measurement information when the measurement information is generated, to identify whether the timer associated with the measurement information expires when the beam failure is determined, and to determine the RLF based on the measurement information when the timer associated with the measurement information has not expired.

According to an embodiment, the instructions may cause the processor to perform beam failure recovery using the candidate Tx beams when the beam failure is determined, and when the timer associated with the measurement information expires, and to determine the RLF based at least partly on the result of performing the beam failure recovery.

According to an embodiment, the instructions may cause the processor to receive second signal blocks, using at least one Rx beam in a direction different from a direction of the first Rx beam and to perform second decoding of the second signal blocks, before performing the beam failure recovery.

According to an embodiment, the instructions may cause the processor to perform the beam failure recovery based at least partly on the result of the second decoding.

According to an embodiment, the instructions may cause the processor to receive a plurality of second signal blocks via a second Tx beam among the candidate Tx beams from the base station, to perform the beam failure recovery based on the received second signal blocks, to start a second timer when the beam failure recovery is successful, to perform second decoding of the second signal blocks, to determine beam failure for the second Tx beam based at least partly on the result of the second decoding, and to determine the RLF associated with the base station before the second timer expires.

As described above, a method of an electronic device may include establishing a beam pair link, using a first Tx beam included in a plurality of Tx beams having different directions transmitted from a base station, and a first Rx beam included in a plurality of Rx beams, receiving information associated with the plurality of Tx beams, using the beam pair link, receiving a plurality of first signal blocks, using the beam pair link, performing first decoding of the first signal blocks, determining beam failure for the first Tx beam based at least partly on the result of the first decoding, identifying measurement information about the plurality of Tx beams, and determining RLF associated with the base station based on the measurement information and the information associated with the Tx beams. The information associated with the plurality of Tx beams may include at least one of a list of candidate Tx beams among the plurality of Tx beams or a threshold associated with qualities of the plurality of Tx beams.

According to an embodiment, the determining of the RLF may include determining the RLF when the first Tx beam is determined as a best Tx beam based on the measurement information or when no candidate Tx beam has a quality equal to or greater than the threshold.

According to an embodiment, the method may further include generating the measurement information by measuring the qualities of the Tx beams, starting a timer associated with the measurement information when the measurement information is generated, identifying whether the timer associated with the measurement information expires, when the beam failure is determined, and determine the RLF based on the measurement information when the timer associated with the measurement information has not expired.

According to an embodiment, the method may further include performing beam failure recovery using the candidate Tx beams when the beam failure is determined, and when the timer associated with the measurement information expires, and determining the RLF based at least partly on the result of performing the beam failure recovery.

According to an embodiment, the performing of the beam failure recovery may further include receiving a plurality of second signal blocks via a second Tx beam among the candidate Tx beams from the base station, starting a second timer when the beam failure recovery is successful, performing second decoding of the second signal blocks, determining beam failure for the second Tx beam based at least partly on the result of the second decoding, and determining the RLF before the second timer expires.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the specification, an electronic device may rapidly determine RLF, thereby preventing call drops and providing continuity for the data communication service.

In addition, a variety of effects and advantages directly or indirectly understood through the disclosure may be provided.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing;
at least one antenna array disposed inside the housing or constituting as a part of the housing and including a plurality of antenna elements;
a processor configured to form a plurality of reception beams (Rx beams) having different directions, using the antenna array; and
a memory operatively connected to the processor and configured to store a threshold,
wherein the memory stores instructions that, when executed, cause the processor to:
establish a beam pair link, using a first Tx beam included in a plurality of transmission beams (Tx beams) having different directions transmitted from a base station, and a first Rx beam included in the plurality of Rx beams;
receive information associated with an 'M' number of candidate Tx beams from among the plurality of Tx beams using the beam pair link, wherein the first Tx beam is excluded from the 'M' number of candidate Tx beams;
select an 'I' number of candidate Tx beams from among the 'M' number of candidate Tx beams based on the information associated with the 'M' number of candidate Tx beams and the threshold;
receive a plurality of first signal blocks, using the beam pair link;
perform first decoding of the first signal blocks;
determine beam failure for the first Tx beam based at least partly on a result of the first decoding;
start a first timer associated with radio link failure (RLF) based at least partly on the result of the first decoding;
perform beam failure recovery associated with the 'I' number of candidate Tx beams based on determining that the beam failure has occurred, using the first Rx beam; and
determine the RLF associated with the base station before the first timer expires, based at least partly on a result of performing the beam failure recovery, and
wherein 'M' is an integer of one or more, and 'I' is an integer of zero or more.

2. The electronic device of claim 1, wherein the instructions cause the processor to:
measure qualities of the first signal blocks, during the first decoding; and
determine the beam failure based at least partly on the qualities.

3. The electronic device of claim 1, wherein the instructions cause the processor to, before performing the beam failure recovery:
receive second signal blocks, using at least one Rx beam in a direction different from a direction of the first Rx beam; and
perform second decoding of the second signal blocks.

4. The electronic device of claim 3, wherein the instructions cause the processor to:
perform the beam failure recovery based at least partly on a result of the second decoding.

5. The electronic device of claim 1, wherein the instructions cause the processor to:
receive second signal blocks via a second Tx beam in a direction different from a direction of the first Tx beam, from the base station;
perform the beam failure recovery based at least partly on the received second signal blocks;
when the beam failure recovery is successful, start a second timer;
perform second decoding of the second signal blocks;
determine beam failure for the second Tx beam based at least partly on a result of the second decoding; and
before the second timer expires, determine the RLF associated with the base station.

6. The electronic device of claim 5, wherein the instructions cause the processor to:
when the second signal blocks are not received from the base station, determine that the beam failure recovery has failed; and
determine the RLF associated with the base station based at least partly on failure of the beam failure recovery.

7. The electronic device of claim 1, wherein the memory further stores count information indicating a specified number of times associated with the beam failure recovery, and
wherein the instructions cause the processor to:
perform the beam failure recovery using the 'I' number of candidate Tx beams;
when a signal block associated with the beam failure recovery is not received from the base station, determine that an attempt for the beam failure recovery has failed;
when the attempt for the beam failure recovery fails for the specified number of times or more, determine that the beam failure recovery has failed; and
determine the RLF associated with the base station based at least partly on failure of the beam failure recovery.

8. An electronic device comprising:
at least one antenna array including a plurality of antenna elements;
a processor configured to form a plurality of reception beams (Rx beams) having different directions, using the antenna array; and
a memory operatively connected with the processor,
wherein the memory stores instructions that, when executed, cause the processor to:
establish a beam pair link, using a first transmission beam (Tx beam) included in a plurality of Tx beams having different directions transmitted from a base station, and a first Rx beam included in the plurality of Rx beams;
receive information associated with the plurality of Tx beams, using the beam pair link, wherein the information associated with the plurality of Tx beams includes a list of candidate Tx beams among the plurality of Tx beams and a threshold associated with qualities of the plurality of Tx beams, receive a plurality of first signal blocks, using the beam pair link;

perform first decoding of the first signal blocks;

determine beam failure for the first Tx beam based at least partly on a result of the first decoding;

identify measurement information about the plurality of Tx beams by measuring the qualities of the plurality of Tx beams;

when the measurement information is identified, start a timer associated with the measurement information;

when the beam failure is determined, identify whether the timer expires;

when the timer has not expired, determine radio link failure (RLF) associated with the base station based on the measurement information and the information associated with the Tx beams, wherein the RLF is determined when no measurement value of the measurement information for the plurality of Tx beams or the candidate Tx beams is equal to or greater than the threshold; and when the beam failure is determined and the timer expires, perform beam failure recovery using the candidate Tx beams without using the measurement information and determine the RLF based at least partly on a result of the beam failure recovery.

9. The electronic device of claim 8, wherein the instructions cause the processor to:

measure qualities of the first signal blocks, during the first decoding; and determine the beam failure based at least partly on the qualities.

10. The electronic device of claim 8, wherein the instructions cause the processor to:

when the first Tx beam is determined as a best Tx beam based on the measurement information or when no candidate Tx beam has a quality equal to or greater than the threshold, determine the RLF.

11. The electronic device of claim 8, wherein the instructions cause the processor to, before performing the beam failure recovery:

receive second signal blocks, using at least one Rx beam in a direction different from a direction of the first Rx beam; and perform second decoding of the second signal blocks.

12. The electronic device of claim 11, wherein the instructions cause the processor to:

perform the beam failure recovery based at least partly on a result of the second decoding.

13. The electronic device of claim 8, wherein the instructions cause the processor to:

receive second signal blocks via a second Tx beam among the candidate Tx beams from the base station;

perform the beam failure recovery based at least partly on the received second signal blocks;

when the beam failure recovery is successful, start a second timer;

perform second decoding of the second signal blocks;

determine beam failure for the second Tx beam based at least partly on a result of the second decoding; and before the second timer expires, determine the RLF associated with the base station.

14. A method of an electronic device, the method comprising:

establishing a beam pair link, using a first transmission beam (Tx beam) included in a plurality of Tx beams having different directions transmitted from a base station, and a first reception beams (Rx beam) included in a plurality of Rx beams;

receiving information associated with the plurality of Tx beams, using the beam pair link, wherein the information associated with the plurality of Tx beams includes a list of candidate Tx beams among the plurality of Tx beams and a threshold associated with qualities of the plurality of Tx beams, receiving a plurality of first signal blocks, using the beam pair link;

performing first decoding of the first signal blocks;

determining beam failure for the first Tx beam based at least partly on a result of the first decoding;

identifying measurement information about the plurality of Tx beams by measuring the qualities of the plurality of Tx beams;

when the measurement information is identified, starting a timer associated with the measurement information;

when the beam failure is determined, identifying whether the timer expires;

when the timer has not expired, determining radio link failure (RLF) associated with the base station based on the measurement information and the information associated with the Tx beams, wherein the RLF is determined when no measurement value of the measurement information for the plurality of Tx beams or the candidate Tx beams is equal to or greater than the threshold; and when the beam failure is determined and the timer expires, performing beam failure recovery using the candidate Tx beams without using the measurement information and determine the RLF based at least partly on a result of the beam failure recovery.

15. The method of claim 14, wherein the determining of the RLF includes:

when the first Tx beam is determined as a best Tx beam based on the measurement information or when no candidate Tx beam has a quality equal to or greater than the threshold, determining the RLF.

16. The method of claim 14, further comprising:

receiving second signal blocks via a second Tx beam among the candidate Tx beams from the base station;

performing the beam failure recovery based at least partly on the received second signal blocks;

when the beam failure recovery is successful, starting a second timer;

performing second decoding of the second signal blocks;

determining beam failure for the second Tx beam based at least partly on a result of the second decoding; and before the second timer expires, determining the RLF.

* * * * *